United States Patent [19]

Hibino et al.

[11] 3,928,744

[45] Dec. 23, 1975

[54] INDUCTION HEATING APPARATUS

[75] Inventors: Masahiro Hibino, Toyonaka;
Masatami Iwamoto, Itami, both of Japan

[73] Assignee: Mitsubishi Denki Kabushiki Kaisha, Tokyo, Japan

[22] Filed: Nov. 12, 1974

[21] Appl. No.: 523,113

Related U.S. Application Data

[63] Continuation of Ser. No. 356,386, May 2, 1973, abandoned.

[30] Foreign Application Priority Data

| May 2, 1972 | Japan | 47-44117 |
| July 19, 1972 | Japan | 47-72279 |
| Nov. 8, 1972 | Japan | 47-11873 |

[52] U.S. Cl. ..................... 219/10.49; 219/10.79
[51] Int. Cl.² ............................................. H05B 5/04
[58] Field of Search .......... 219/10.49, 10.79, 10.67; 126/340; 220/9 F, 55 D, 55 E, 55 F

[56] References Cited
UNITED STATES PATENTS

| 1,975,437 | 10/1934 | Sorrel | 219/10.49 |
| 3,530,499 | 9/1970 | Schroeder | 219/10.49 |
| 3,684,853 | 8/1972 | Welch et al. | 219/10.49 |
| 3,786,222 | 1/1974 | Harnden | 219/10.49 |

FOREIGN PATENTS OR APPLICATIONS

| 1,157,711 | 7/1969 | United Kingdom | 219/10.49 |

*Primary Examiner*—Bruce A. Reynolds
*Attorney, Agent, or Firm*—Oblon, Fisher, Spivak, McClelland & Maier

[57] ABSTRACT

An induction heating apparatus has a magnetic circuit which is capable of passing an alternating magnetic flux, created by an exciter operated under a commercial frequency, through a non-magnetic high conductive plate to a ferromagnetic material so as to result in heating the ferromagnetic material due to the generation of eddycurrents within the high conductive plate. The induction heating apparatus may comprise an induction heating cooking apparatus wherein the iron cooking vessel has an outer copper or aluminum plate secured to the bottom surface thereof.

12 Claims, 56 Drawing Figures

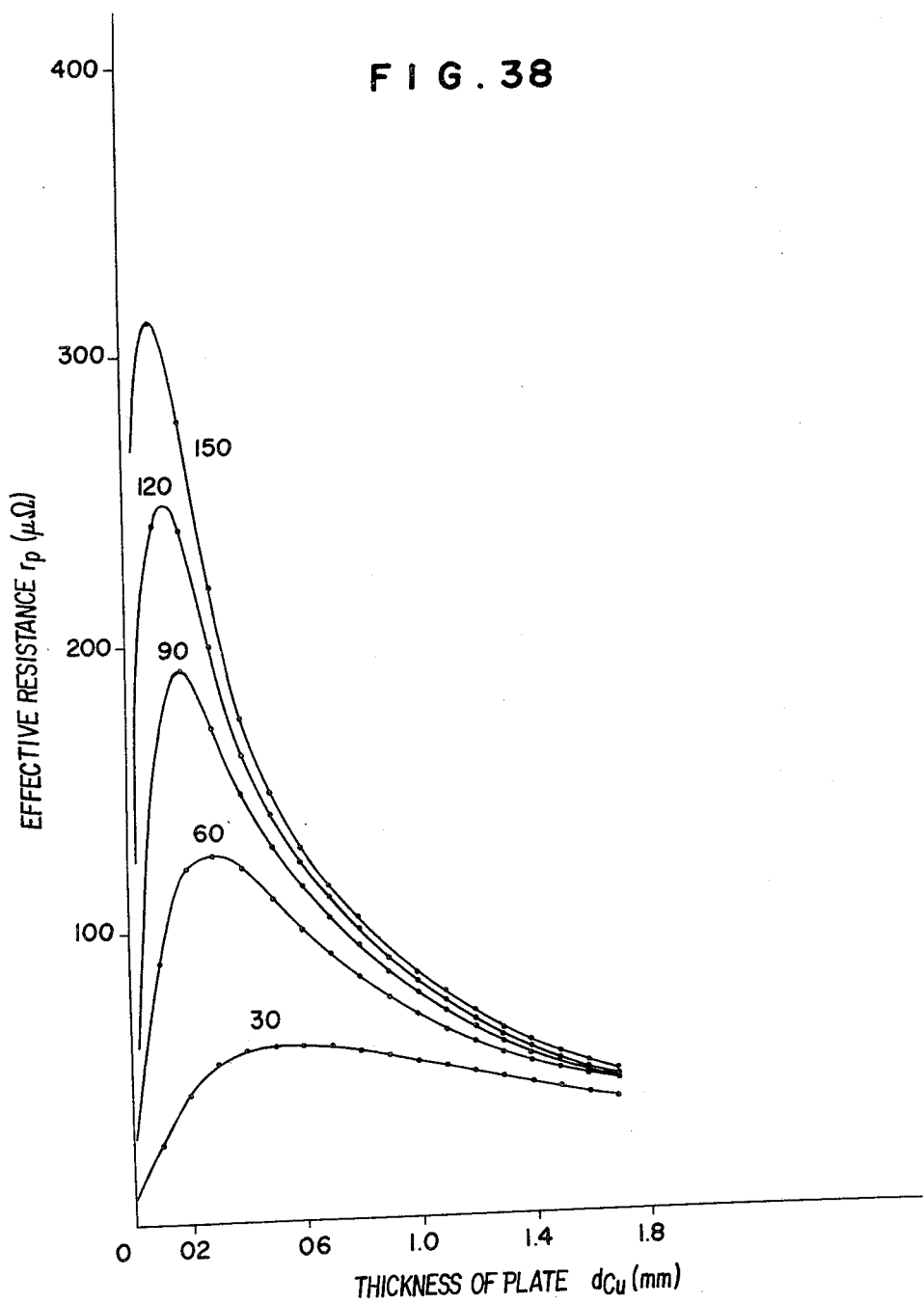

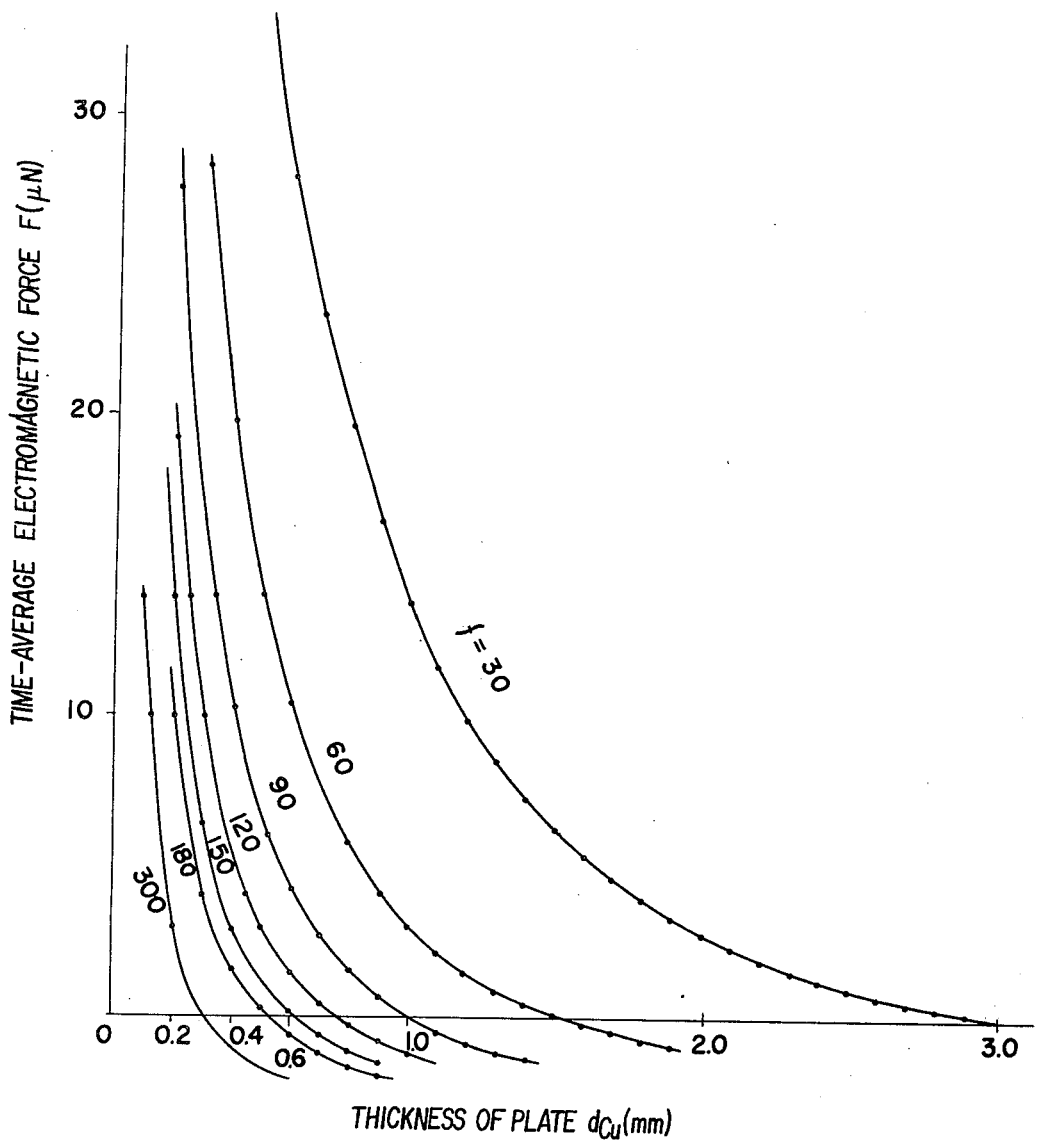

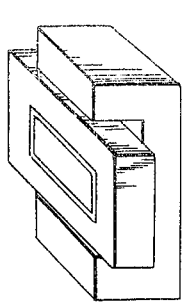
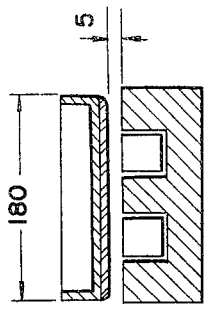
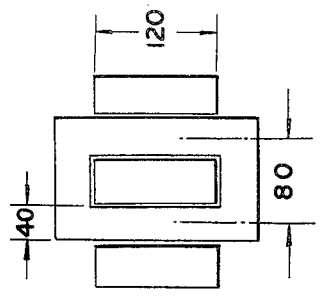
FIG.50A
FIG.50B
FIG.50C
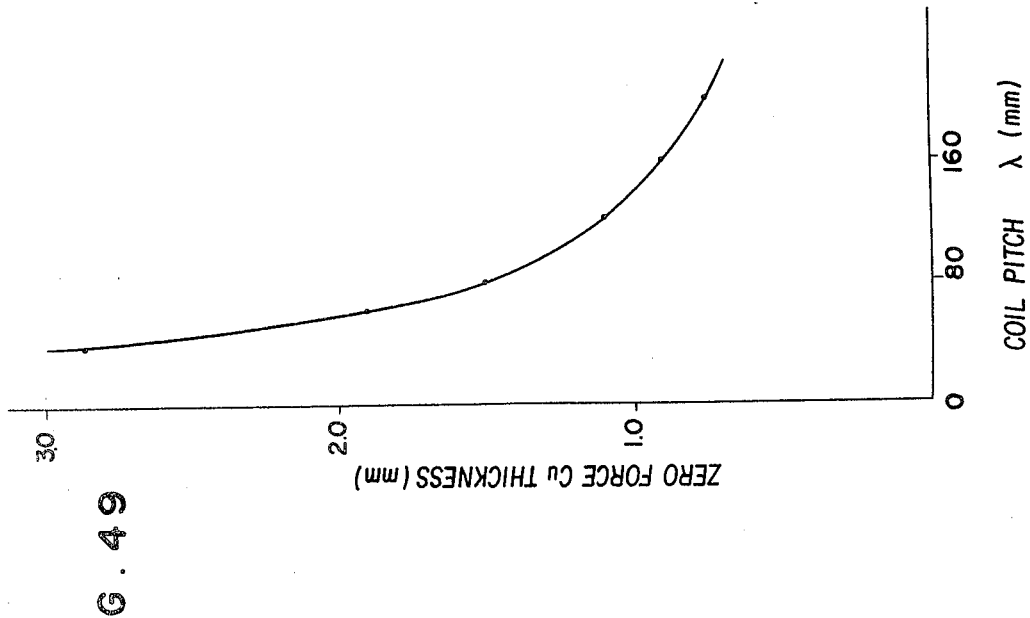
FIG.49

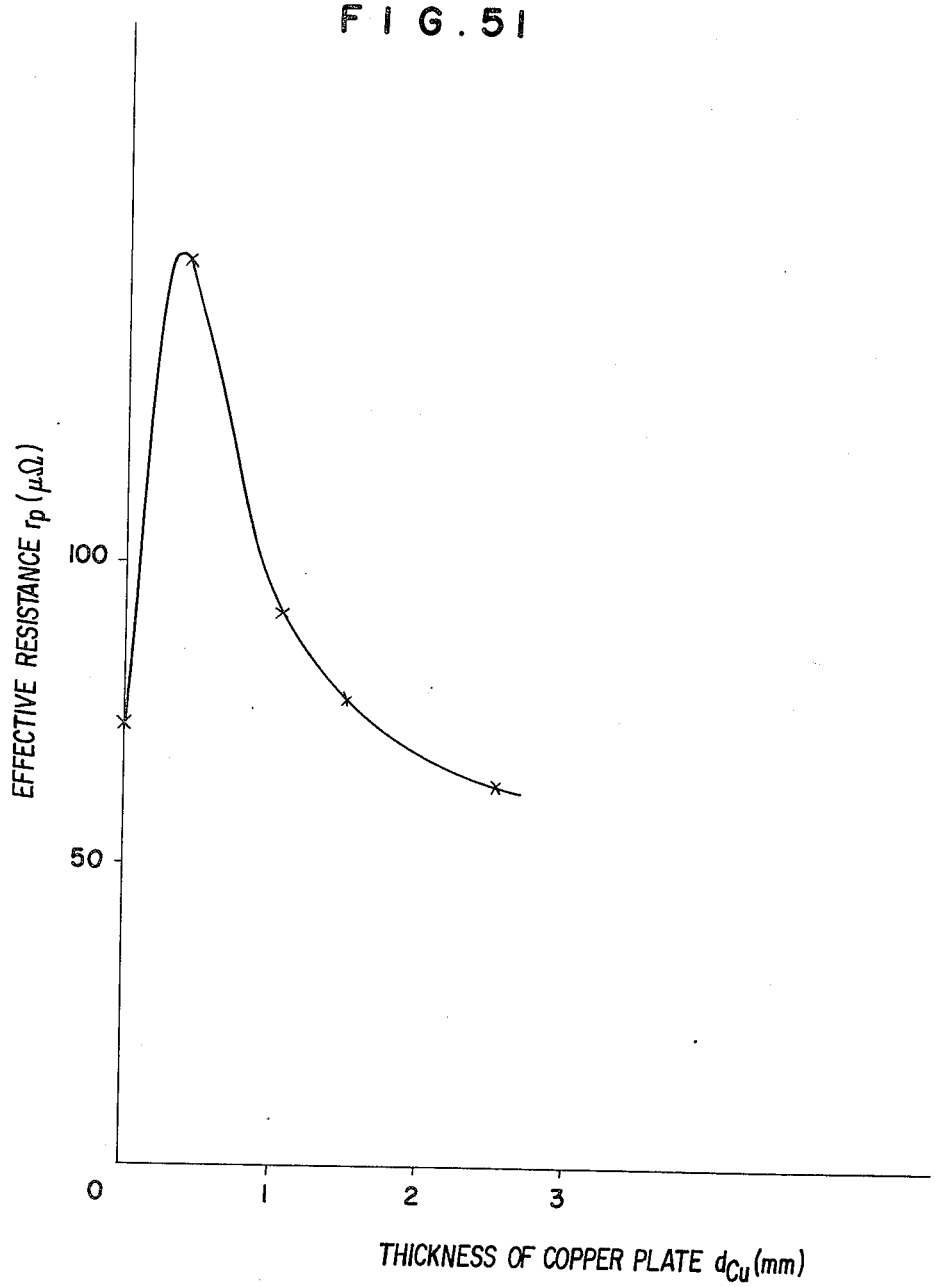

INDUCTION HEATING APPARATUS

This is a continuation, of application Ser. No. 356,386, filed May 2, 1973, abandoned.

BACKGROUND OF THE INVENTION

1. Field of the Invention

The present invention relates generally to induction heating apparatus, and more particularly to an induction heating cooking apparatus.

2. Description of the Prior Art

Induction heating apparatus which employs electromagnetic induction to heat a metal element by inducing eddy-current or hysteresis losses therein caused by applying an alternating magnetic flux are known. Cooking vessels utilizing such heating systems have been made of ferromagnetic material such as iron, or other conductive materials such as copper or aluminum. In general, it has also been known that the caloric value given to the cooking vessel increases with a corresponding rise in the frequency of the exciting current, whereby the total efficiency of the cooking apparatus is increased. An excitation ampere-turn for obtaining a predetermined caloric value can be small and the electromagnetic force applied to the cooking vessel can also be small.

However, when the frequency of the exciting current is too low, such as is the case with commercial frequencies of 50–60Hz, there have been various disadvantages of low caloric value, low total efficiency, and high electromagnetic force. Admittedly however, it is quite economical to employ commercial frequencies because no frequency converter is required.

SUMMARY OF THE INVENTION

Accordingly, it is an object of the present invention to provide a practical induction heating apparatus characterized by a high heating efficiency, even when employing low excitation frequency, such as for example, commercial frequencies, and a low electromagnetic force applied to the cooking vessel so as to reduce noise and vibration.

The foregoing and other objects are achieved according to this invention through the provision of an induction heating apparatus which includes an exciter for generating an alternating magnetic field, a ferromagnetic element forming a portion of the magnetic path of the alternating magnetic field, and a non-magnetic high conductive plate having a predetermined thickness which is placed between the exciter and the ferromagnetic element and through which the alternating magnetic flux is also passed, whereby heating results from eddy-currents induced within the high conductive plate.

This invention is especially effective as applied to induction heating cooking apparatus which may be excited by commercial frequencies wherein a cooking vessel having a laminated bottom portion comprises an inner ferromagnetic plate and an outer non-magnetic high conductive plate. The thickness of the high conductive plate can be selected depending upon various variable parameters inherent in the construction of the present invention. Such thickness selection permits the attainment of an especially high thermal efficiency while also preventing substantial noise and vibration due to a substantial reduction in the electromagnetic forces applied to the vessel.

The induction heating apparatus according to this invention comprises a cooking vessel having a bottom portion including an inner ferromagnetic plate and an outer high conductive plate, which may, for example, be a vessel which is made of iron and has a copper or aluminum plate secured to the outer surface of the bottom portion, or such vessel may be made of copper or aluminum having an iron plate secured to the inner surface of the bottom portion. Still further, the induction heating apparatus may also comprise a vessel having a bottom portion wherein a ferromagnetic material is embedded within the vessel made of the high conductive material. Yet further, the induction heating apparatus may be made of a non-metallic material in which is embedded a laminar plate made of a high conductive plate and a ferromagnetic plate.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 38 is a graph showing the characteristic curves of the equivalent resistance as a function of the copper plate with a parameter of excitation frequency;

FIG. 40 is a graph showing the characteristic curves of the time-average electromagnetic force as a function of the copper plate thickness with a parameter of excitation frequency;

FIG. 49 is a graph showing the characteristic curve of the coil pitch dependency of the optimum copper plate thickness at zero time-average electromagnetic force, from FIG. 48;

FIG. 50A is a perspective view of an exciter utilized within the practical model of FIG. 29;

FIG. 50B is a sectional view of the exciter of FIG. 50A and a cooking vessel utilized within the model of FIG. 29;

FIG. 50C is a plan view of the exciter of FIG. 50A; and

FIG. 51 is a graph showing the characteristic curve of the equivalent resistance to the copper plate thickness as derived from the test model of FIGS. 50A to 50C.

DESCRIPTION OF THE PREFERRED EMBODIMENTS

Figure 1:
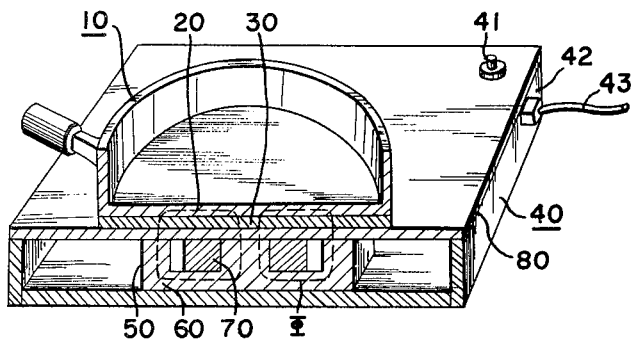
FIG. 1 is a view, partly in section, of one embodiment of an induction heating apparatus constructed according to this invention and showing its cooperative parts.
Figure 2:
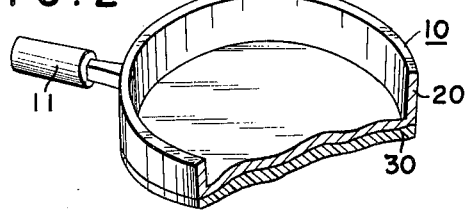
FIG. 2 is a partially broken view of a cooking vessel utilized with the apparatus of FIG. 1.
Figure 3:
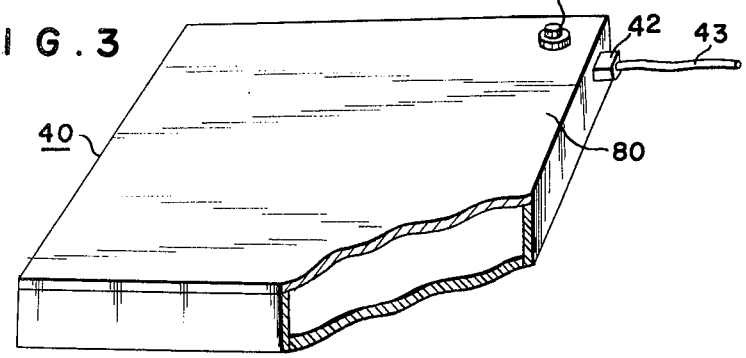
FIG. 3 is a partially broken view of the exciter range of FIG. 1.
Figure 4:
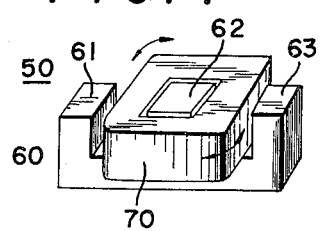
FIG. 4 is a perspective view of an exciter which may be utilized in the apparatus of FIG. 1.

Referring now to the drawings, and more particularly to FIGS. 1-4 thereof, the induction heating apparatus constructed according to this invention and which is especially adaptable to induction heating cooking vessels is illustrated as including an exciter 50 disposed within a cavity of a substantially rectangular range table 40 whereupon a cooking vessel 10, placed upon the upper surface of the range table 40, may be heated by induction. Exciter 50 includes a substantially E-shaped iron core 60 having three upstanding magnetic poles 61, 62 and 63, an excitation coil 70 being wound around the center magnetic pole 62. A suitable cover plate 80 is placed upon the upper surface of the range table 40 for protecting the exciter 50 from the cooking vessel 10 which is supported thereon, and may be made of a non-magnetic material having high mechanical and thermal strength properties, such as for example, stainless steel or a reinforced glass plate, plate 80 having a thickness of less than several millimeters. The cooking vessel 10 is laminated and includes a non-magnetic plate 30, characterized by high conductivity as compared to the conductivity of ferromagnetic material, adhered to the bottom external surface of the upper ferromagnetic portion 20 of cooking vessel 10, plate 30 being made of, for example, copper or aluminum, while the upper portion 20 may be made of, for example, iron. As seen in FIG. 1, the paths of magnetic flux, shown by the dotted chain line, pass through the pole pieces and surround coil 70. In order to provide electrical power to the apparatus, a power cord 43 is further provided, such of course being connected to the table 40 by means of a plug 42, and a switch 41, disposed upon the upper surface 80 of table 40, controls the admission or termination of the power.

Figure 5:
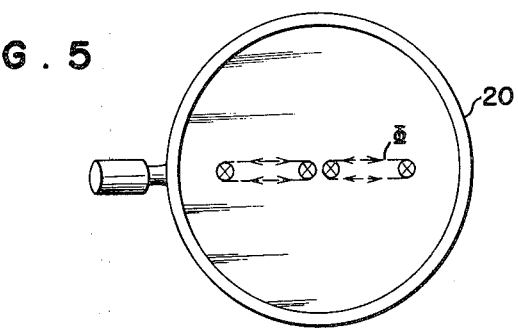
FIG. 5 is a plan view of the vessel of FIG. 1 showing the condition of the magnetic flux.
Figure 6:
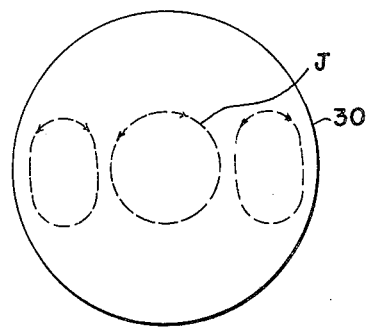
FIG. 6 is a horizontal section taken through the conductive plate of the vessel of FIG. 1 showing the condition of the eddy-currents.

With particular reference to FIGS. 5 and 6, there is shown the magnetic flux $\Phi$ passing through the iron plate portion 20 of the vessel 10, and an eddy-current J induced within the copper plate 30 by means of the magnetic flux Φ within portion 20, respectively. The cooking vessel is thus heated by means of the joule loss of the eddy-current formed within the copper plate 30, whereupon food placed within the vessel 10 may be cooked. Similarly, as seen in FIGS. 7 - 9 there is shown the magnetic flux patterns Φ passing through conventional cooking vessels 10B and 10C made of iron, and copper, as compared with the cooking vessel of the present invention, respectively.

Figure 7:
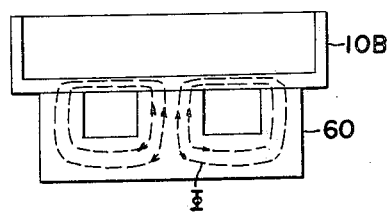
FIGS. 7 to 9 are respectively schematic section views illustrating the condition of the magnetic flux within an iron vessel, a copper vessel, and the cooking vessel of this invention.

In the instance of the iron vessel, for example, as shown in FIG. 7, a substantial amount of magnetic flux Φ passes from the exciter core 60 to the cooking vessel 10B and subsequently returned through the bottom portion of the vessel to the core 60. In such case, the magnetic flux passing through the vessel bottom causes the formation of eddy-currents within the vessel bottom so as to generate joule heat losses. However, the joule heat loss is relatively small due to the fact that the conductivity of iron is substantially low in comparison with that of copper or aluminum. Moreover, the electromagnetic force created between the iron core 60 and the cooking vessel 10B results in an attractive force which causes vibration and noise due to the high absolute value of such force.

Figure 8:
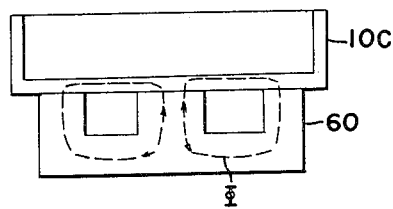

Similarly, in the instance of the copper or aluminum cooking vessel, as shown in FIG. 8, the magnetic flux Φ passes from the exciter core 60 to the vessel 10C whereby a portion thereof is lost as leakage through the space therebetween while the remainder is returned to the exciter core 60. The resulting magnetic flux thus becomes too small due to the counteractive effects of a magnetic field created by means of the eddycurrents passing through the copper plate 10C. Consequently, although copper or aluminum is characterized by substantially high conductivity, such materials are also characterized by substantially low magnetic flux values, and accordingly, the caloric value of the copper or aluminum vessel is smaller than that of an iron cooking vessel. However, in addition, as the absolute value of the repulsive force between the iron core 60 and the vessel is relatively small, there is admittedly substantially no vibration and noise.

Figure 9:
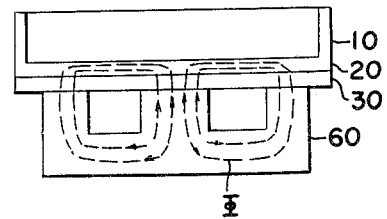

In the cooking vessel constructed according to this invention, however, as shown in FIG. 9, the magnetic flux Φ passes from the iron core 60 through the copper or aluminum plate 30 adhered upon the iron vessel 20 and is further routed through the bottom portion of the vessel 20 whereupon it is then passed through the copper or aluminum plate 30 again so as to return to the exciter core 60. When the copper or aluminum layer is of a suitable thickness, the magnetic flux Φ is almost the same as or slightly less than that of the iron vessel of FIG. 7. In addition, since a high magnetic flux is passed through a highly conductive metal such as copper or aluminum, the joule loss within such portion is quite high so as to increase the caloric value of the cooking vessel. In fact, according to experimentation, about 95% of the total caloric value generated is generated within such portion of the vessel.

In connection with such apparatus, it is further noted that an electromagnetic force is created at the gap existing between the iron core 60 and the cooking vessel 10, and comprises two components. One component is a force which is applied to the boundary surface of the magnetic portion 20 of the vessel 10 which consequently attracts the vessel to the iron core 60. The other component is the Lorentz force existing between the eddy-current within the vessel bottom and the exciting current passing through the exciting coil 70. There is about 180° phase difference between the eddy-current and the exciting current and consequently, such force is a repulsive force which tends to raise the vessel 10 from the table 40 and core 60.

Figure 10:
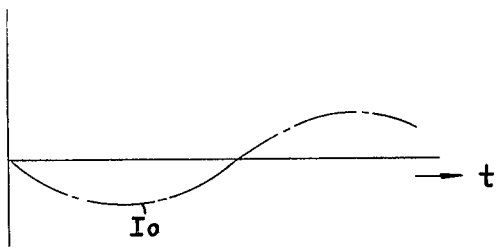
FIG. 10 is a graph showing the characteristic curve of exciting current as a function of time.
Figure 11:
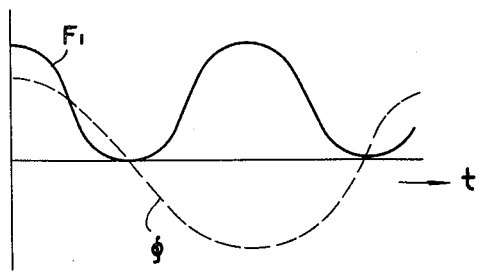
FIG. 11 is a graph showing the characteristic curves of magnetic flux and the attractive force as a function of time.
Figure 12:
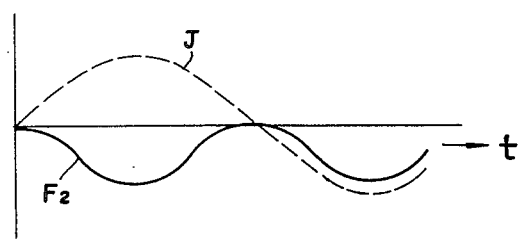
FIG. 12 is a graph showing the characteristic curves of the eddy-current and the repulsive force as a function of time.

With particular reference to FIGS. 10–13, the electromagnetic force may be illustrated as a function of time. The aforementioned attractive force is seen to increase in proportion to the square of the magnetic flux, and is periodically changed with a frequency equal to two times the frequency of the current. At the maximum and minimum values of the magnetic flux, the attractive force is maximized, as is shown in FIGS. 10 or 11, the exciting current $I_o$ and the magnetic flux Φ also being illustrated. The repulsive force similarly increases substantially proportional to the square of the eddy-current whereby such force is maximized at the maximum or minimum points of the exciting current, as is the case of the attractive force. Such condition is shown in FIG. 12, wherein the eddy-current J and the repulsive force $F_2$ are plotted as a function of time. The total electromagnetic force F is of course derived from the combination of the attractive force $F_1$ and the repulsive force $F_2$, and the time change in such total force F is shown by the curve in FIG. 13.

Figure 13:
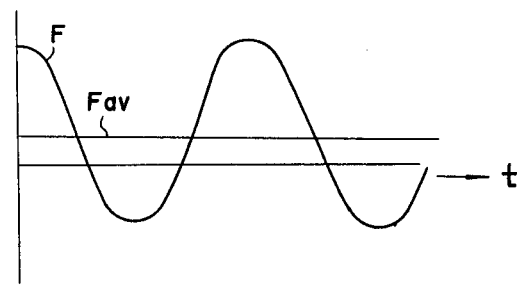
FIG. 13 is a graph showing the characteristic curves of the total electromagnetic force and the average electromagnetic force as a function of time.

The total electromagnetic force F may also be considered to be in a form wherein the static force is superimposed upon the alternating electromagnetic force having two times the frequency of the current, the static force, i.e., the average electromagnetic force, which in turn is an average of the alternating electromagnetic force, being shown by the curve $F_{AV}$ in FIG. 13. Thus, when the thickness of the copper plate of the cooking vessel is small, the attractive force is high and the repulsive force is small, and accordingly, the average electromagnetic force is a relatively large attractive force. When the thickness of the copper plate is gradually increased, the attractive force is rapidly decreased and the repulsive force is gradually increased, and consequently the average electromagnetic force rapidly becomes a relatively small attractive force and is in fact zero at a predetermined thickness whereupon the repulsive force is gradually applied.

As stated heretofore, when the cooking vessel of this invention is utilized, the total electromagnetic force is remarkably decreased and accordingly the resulting vibration and noise are decreased. As a practical and economical cooking vessel which may be excited by means of commercial frequencies, in the instance that an iron vessel having a copper plate adhered thereto along its bottom surface is utilized, when the thickness of the copper plate is less than 1.7 mm, and especially within the range of 0.2 - 1.7 mm, the effect of this invention is remarkably high. Moreover, it is noted that a thickness of 0.2 - 1.3 mm is suitable for obtaining a high thermal efficiency while a thickness of 1.3 - 1.7 mm is suitable for substantially decreasing the electromagnetic force.

In the instance that an iron vessel having an aluminum plate adhered thereto along its bottom surface is utilized, when the thickness of the aluminum plate is less than 2.7 mm, and especially within the range of 0.3 - 2.7 mm, the effect of this invention is remarkably high. In particular, a thickness of 0.3 - 2.1 mm is quite suitable for obtaining a high thermal efficiency, while a thickness of 2.1 - 2.7 mm is similarly quite suitable for decreasing the resulting electromagnetic force. In accordance with this invention then, there is provided an induction heating cooking apparatus which exhibits high thermal efficiency and low vibration and noise due to the fact that such apparatus incorporates a double structure comprising an inner ferromagnetic plate, such as for example, an iron plate along the bottom portion of the apparatus and an outer copper or aluminum plate having a desirable thickness adhered to the outer surface of the iron plate. In other words, there is provided induction heating apparatus for heating an element by means of induction with high thermal efficiency due to the placement of a conductive element interposed between an exciter and a magnetic element whereupon the conductive element becomes heated by the joule loss associated with the eddy-current formed therein.

Figure 14:
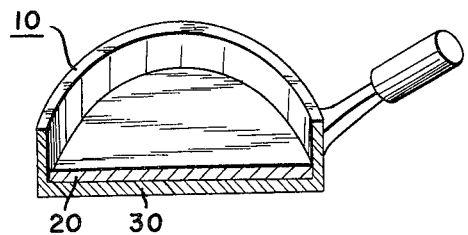
FIG. 14 is a perspective view, partly in section, of another embodiment of the vessel apparatus constructed according to this invention.

Referring now to FIG. 14, another embodiment of an induction heating cooking apparatus constructed according to this invention is disclosed as including a ferromagnetic element 20, such as for example, an iron plate, disposed above the bottom plate 30 of a cooking vessel 10 made of aluminum, copper or other electrically conductive metal. The iron plate utilized has a thickness of at least 1 mm.

Figure 15:
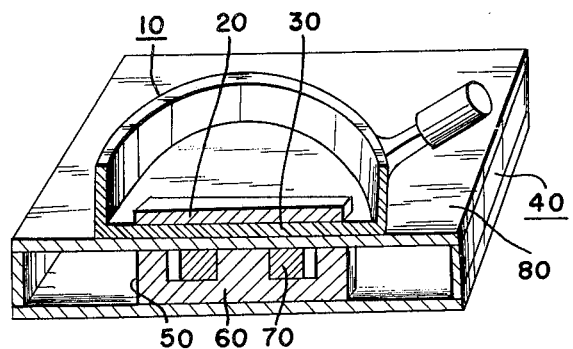
FIG. 15 is a perspective view, partly in section, of still another embodiment of the apparatus of the present invention.
Figure 16:
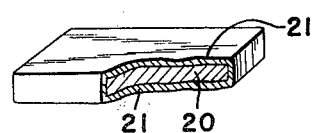
FIG. 16 is a partially broken perspective view of a coated iron plate of the present invention.

Still another embodiment of an induction heating cooking apparatus constructed according to this invention is illustrated in FIG. 15, the ferromagnetic element again being disposed upon the inner portion of the vessel 10 as is the case of the embodiment of FIG. 14, but in the present instance is limited to the configuration of a bar, the size of which is sufficient for conducting the magnetic flux whereby the weight of the vessel may be reduced. The iron plate 20 of FIGS. 14 and 15 may of course be bonded to the outer copper plate 30 by means of welding or other adhering techniques, and in this manner a conventional copper or aluminum cooking vessel can be modified by securing an iron plate 20 to the inside portion thereof so as to form the cooking vessel of this invention. As shown in FIG. 16, the magnetic element 20 can be coated with a suitable coating 21, of for example, polytetrafluoroethylene or other enamel, so as to render the vessel sanitary and innoxious to food.

Figure 17:
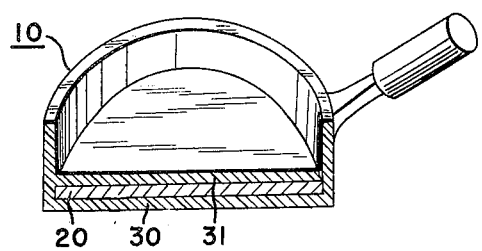
FIG. 17 is a perspective view, partly in section, of yet another embodiment of the vessel apparatus of this invention.

FIG. 17 discloses yet another embodiment of a cooking vessel constructed according to this invention, wherein the iron element 20 is embedded within the bottom portion of a molded aluminum vessel 10. The element 20 is interposed between an upper plate 31 and a lower plate 30 of vessel 10, the latter element plate being the heating element while the former element plate does not perform any electrical function, but merely serves to protect and seal the iron plate 20 so that a neat and clean appearance of the vessel is attained.

Figure 18:
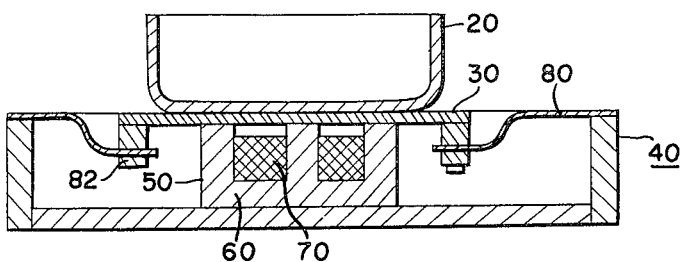
FIGS. 18 and 19 are respectively sectional views of still other embodiments of the apparatus of the present invention.

Referring now to FIG. 18, a further embodiment of cooking apparatus constructed according to this invention is disclosed wherein the substantially U-shaped vessel 20 is formed of a ferromagnetic material and is disposed upon a highly conductive plate 30 which in turn is supported by circumferential support means 80. In this embodiment, as is the case of the vessel disclosed in FIG. 2, the inner iron element 20 is separated from the exciter 50 by means of the outer copper plate 30, it being further apparent that in such embodiment, a conventional iron cooking vessel may be utilized. The conductive plate 30 of course has the same function as the outer copper plate 30 of FIG. 2, whereupon heat is generated within such plate. In this system of the embodiment, there is of course the possibility that a small mechanical gap, such as for example, of 0 – 0.5 mm, may exist between the conductive plate 30 and the iron vessel 20 due to manufacturing tolerances or rust formation associated with vessel 20, and in such instance although the currents at the center of the iron vessel 20 and the conductive plate 30 are respectively conducted within horizontal planes only, there being no passage between the two elements, the caloric value of the apparatus is not substantially affected.

Figure 19:
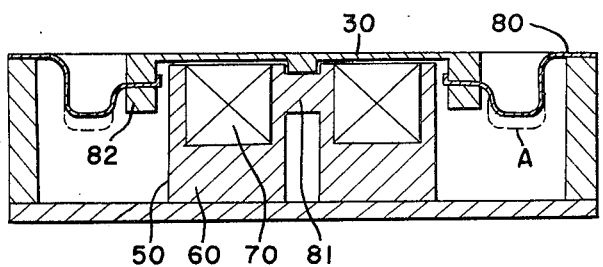

It is noted that the support means 80 is connected with the conductive plate 30 in such fashion so as to serve the function of receiving liquid which overflows from the vessel 20, and in addition, also serves to compensate for any radial thermal expansion of plate 30, such compensation being the deformation of means 80 to the position shown as A in FIG. 19. The radial elongation of the conductive plate 30, having an outer diameter of 220 mm, is only about 0.3 mm at 180° C. FIG. 19 discloses a modification of the embodiment of FIG. 18, wherein the center of the conductive plate 30 is fixed at the center of the iron core 60 by means of a tongue and groove assembly, and the peripheral portion of the conductive plate 30 is radially spaced from the peripheral portion of the iron core 60.

Figure 20:
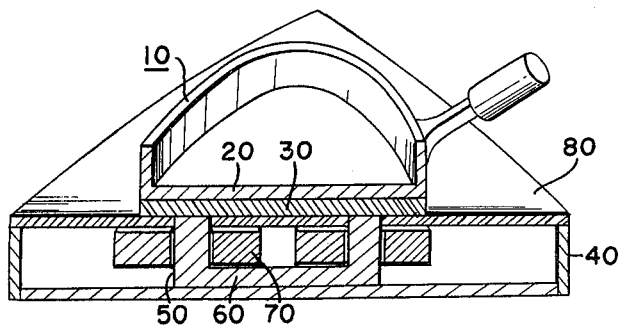
FIG. 20 is a perspective view, partly in section, of still another embodiment of the present invention utilizing the exciter of FIG. 22.
Figure 21:
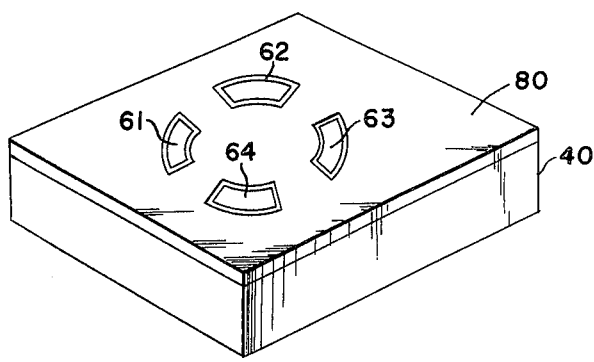
FIG. 21 is a perspective view of the range within which the exciter of FIG. 22 is housed.
Figure 22:
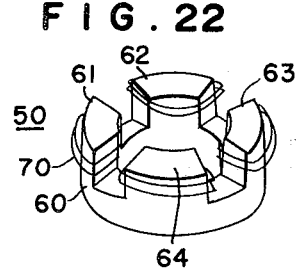
FIG. 22 is a perspective view of another embodiment of an exciter.

With particular reference now being made to FIGS. 20–22, a still further embodiment of the present invention is disclosed wherein a circular iron core 60 comprises four, angularly spaced magnetic poles 61–64 which project through the upper plate 80 of table 40 so as to be in direct contact with the bottom of the cooking vessel 10. Each pole piece is arcuate and forms a sector of a circle defined by the base of core 60, there being coils 70 respectively wound around each pole piece. In this manner, the distance between the iron core 60 and the vessel 10 becomes small relative to the thickness of the upper plate 80 whereby the thermal efficiency is increased.

Figure 23:
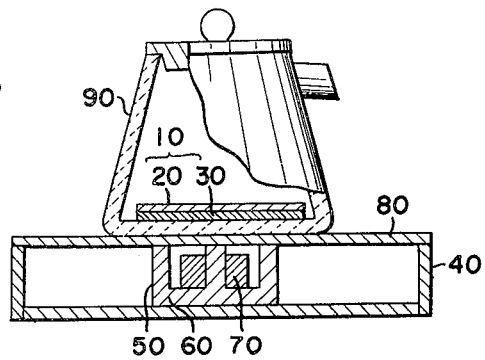
FIG. 23 is a partially broken sectional view of a further embodiment of the apparatus of the present invention.

In FIG. 23 there is shown a yet further embodiment of cooking apparatus constructed according to this invention, wherein a non-metallic vessel 90, such as for example, a porcelain teapot, has a heating element 10 disposed at the bottom portion thereof which includes an iron plate 20 disposed above and bonded to a copper plate 30. In such instance, the heating element 10 is inductively heated through the bottom of the non-metallic vessel 90 whereby the contents of the vessel 90 are heated. In this manner, there is provided means to inductively heat a non-metallic vessel, such as for example, heat resistant glass, porcelain, or the like, which have high heat retaining and sanitary properties.

Figure 24:
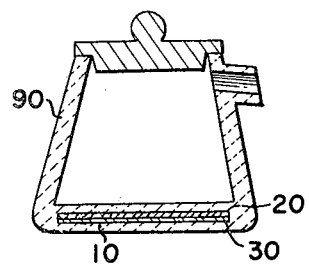
FIGS. 24 – 26 are respectively sectional views disclosing other embodiments of the cooking vessel of the apparatus of FIG. 23.
Figure 25:
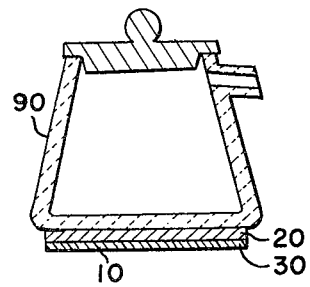
Figure 26:
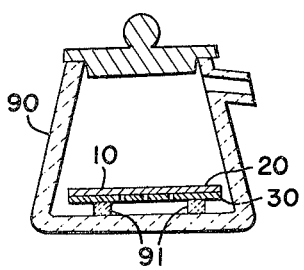

FIGS. 24 and 25 respectively disclose modifications of the embodiment of FIG. 23, wherein for example, FIG. 24 discloses a copper-iron plate type heating element 10 embedded within the bottom portion of the vessel 90, while in FIG. 25, the copper-iron heating element 10 is secured to the exterior bottom surface of the vessel 90. Similarly, in FIG. 26, the composite heating element 10 is supported within the vessel 90 upon legs 91 made of an insulating or magnetic material, whereby the contents of the vessel can be heated without having the heating element 10 in direct contact with the vessel 90 which has a low heat resistance.

In order to insure the proper operation of the induction heating apparatus of this invention, it is necessary to determine the relationship between the thickness of the high conductive element, the thermal efficiency, and the electromagnetic force imparted to the cooking vessel, so that the optimum thickness of the high conductive element may be determined. It is noted that the electromagnetic phenomenon of the induction heating apparatus is similar to that of a transformer, wherein the excitation coil is considered as the primary winding while the cooking vessel is considered as the secondary winding.

Figure 27:
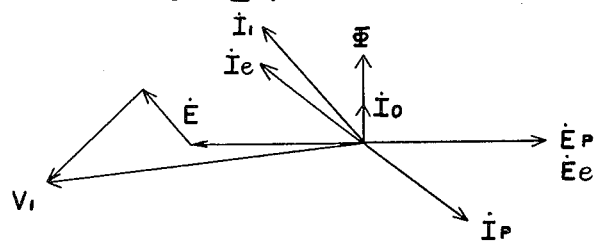
FIG. 27 is a vector diagram of the induction heating apparatus constructed according to this invention.

Accordingly, the vector diagram shown in FIG. 27 is similar to the type of diagram which would be associated with a transformer. The magnetic flux $\Phi$ is formed as a result of the exciting current $\dot{I}_o$, and a voltage $\dot{E}_p$ is induced within the vessel due to the change in the magnetic flux $\Phi$ as a function of time. A voltage $\dot{E}_e$, having the same phase as the voltage $\dot{E}_p$ is induced within the primary winding, while an electric current $\dot{I}_p$, which is derived by dividing $\dot{E}_p$ by $\dot{Z}_p$, wherein: $\dot{Z}_p = r_p + jX_p$ $r_p$ representing the equivalent resistance of the vessel and $X_p$ representing the equivalent reactance of the cooking vessel, is passed through the cooking vessel. In order to cancel out the magnetic flux formed as a result of the current $\dot{I}_p$, an electric current $\dot{I}_e$ having a phase difference of 180° from that of current $\dot{I}_p$ is passed through the primary winding. Accordingly, a composite current $\dot{I}_l$ derived from currents $\dot{I}_o$ and $\dot{I}_e$ is also passed through the primary winding whereupon a voltage $\dot{V}_l$, derived by adding the voltage $\dot{E}_e$ to the voltage drop caused by the primary resistance $r_l$ and a leakage reactance $X_l$, is applied to the terminal of the primary winding.

Figure 28:
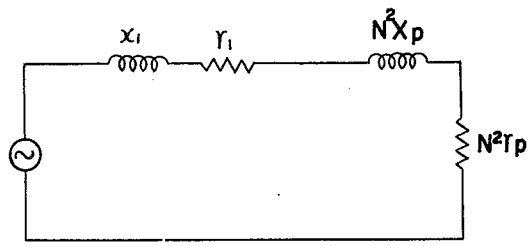
FIG. 28 is an equivalent circuit of the induction heating apparatus according to this invention corresponding to the diagram of FIG. 27.

An equivalent circuit corresponding to the vector diagram of FIG. 27 is shown in FIG. 28, wherein N represents the number of turns upon the primary winding. The equivalent resistance $r_p$ can be represented by the following equation:

$$r_p = (W/(at)^2)$$

wherein W represents a caloric value in watts and at represents the excitation ampere-turns. Accordingly, $r_p$ is a caloric value per 1 at. In addition, from the equivalent circuit of FIG. 28, the efficiency E of the induction heating apparatus can be shown by the following equation:

$$E = \frac{N^2 r_p}{r_1 + N^2 r_p} \times 100(\%)$$

Accordingly, it is seen that the important factors inherent in the efficiency of the induction heating apparatus are the resistance of the excitation winding in the primary side $r_1$ and the equivalent resistance of the cooking vessel $r_p$. It is to be noted, that within the above, the core current loss has been neglected. However, when the coil is placed upon an iron core, the core loss cannot be neglected, and in such case, the resistance $r_1$ is the sum of the coil resistance and the resistance corresponding to the core loss. It is further understood from the above considerations, that the thermal efficiency of the induction heating apparatus can be calculated by measuring the equivalent resistance $r_p$ of the cooking vessel. In addition, the electromagnetic force applied between the cooking vessel and the exciter is also quite an important factor of the induction heating apparatus, and such electromagnetic force can be analyzed as follows.

The equivalent resistance $r_p$ of the cooking vessel and the electromagnetic force F applied to the vessel are dependent upon the following factors:

a. the material and thickness of the high conductive plate of the vessel;
b. the distance between the vessel and the iron core, i.e., the gap length;
c. the shape of the iron core which determines the coil pitch; and
d. the frequency of the exciting current.

Figure 29:
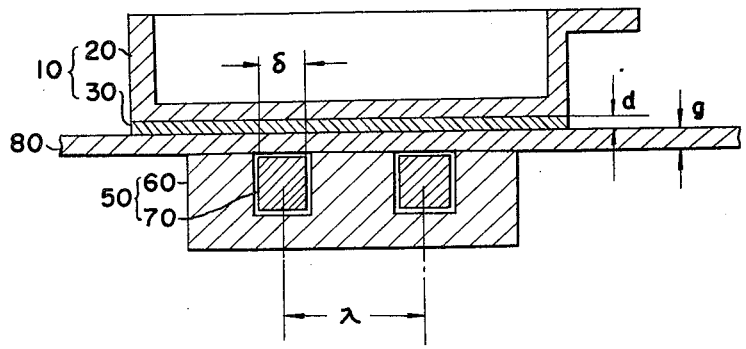
FIG. 29 is a sectional view of a practical model of the induction heating apparatus constructed according to this invention with which theoretical analysis may be carried out.

FIG. 29 discloses a practical model constructed in accordance with the present invention illustrating the various variable parameters, the particular values of which may be appropriately selected in accordance with the foregoing analysis. In such model, the cooking vessel may be approximately 150 – 250 mm in length or diameter while the thickness of the iron plate 20 which forms the inner bottom portion of the vessel may be approximately 1.0 – 3.0 mm. An optimum thickness $d_{Cu}$ of the copper plate 30 of the bottom portion of the vessel is then able to be determined, and the specific resistance $\rho$ of the copper plate is provided to be 1.72$\mu\Omega$-cm. The distance between the bottom of the vessel 10 and the polar surface of the iron core 60 is known as the gap length and is designated g, and such distance may have a range of 0 – 10 mm. Similarly, the coil pitch $\lambda$, that is, the distance between the centers of the poles of the core, or the distance between the centerlines of diametrically opposed portions of the coil, of the excitation coil 70 wound upon the iron core 60 is to be determined, it being noted that various types of iron cores and excitation coils can be used whereupon the coil pitch $\lambda$ will vary depending upon the particular type chosen.

Figure 30:
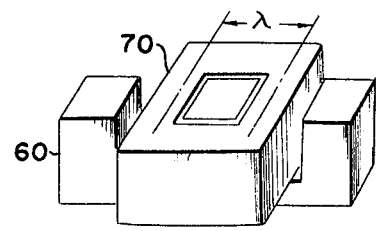
FIGS. 30 – 33 are respectively perspective views of various exciters which may be utilized within the practical model of FIG. 29.
Figure 31:
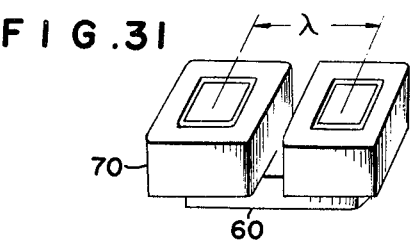
Figure 32:
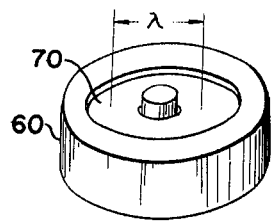
Figure 33:
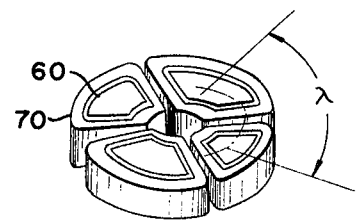

For example, in FIG. 30 there is illustrated a substantially E-shaped square type iron core having three poles wherein the coil pitch + is equal to approximately one-half the core length. In FIG. 31 there is shown a substantially C-shaped square type iron core having two poles, wherein the coil pitch $\lambda$ is equal to the distance between the centers of the magnetic poles, the size of the square iron cores of FIGS. 30 and 31 being approximately 150 – 220 mm in length. Likewise, FIG. 32 shows a circular iron core having an annular coil 70 disposed within an annular slot formed between the axial pole and the peripheral wall of the core. In such an exciter, the coil pitch $\lambda$ is the diametrical dimension extending between two points located at radii equal to one half the radial extent of the annular coil 70. The outer diameter of the circular iron core may be approximately 150 - 200 mm. Correspondingly, FIG. 33 shows an iron core comprising four pole sectors wherein the coil pitch $\lambda$ is the angular distance between the radial lines bisecting adjacent magnetic poles taken along such radial lines at a radial location equal to one half the radial extent of the cores. A suitably sized iron core is considered to be one wherein the radial extent of the sectors is approximately 150 – 220 mm. It is noted that all of the illustrated coil pitches $\lambda$ are mutually equivalent with one another even though the shape of the iron cores are different.

Figure 34:
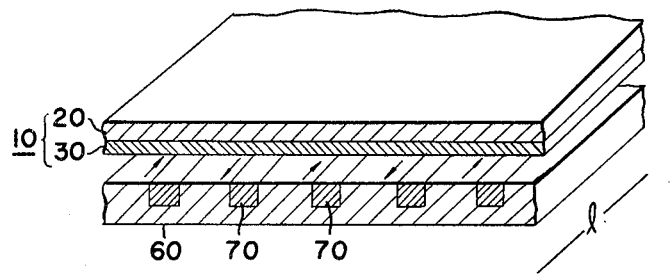
FIG. 34 is a perspective view, partly in section, of a portion of the practical model of FIG. 29 showing the exciter and plate components.

Turning now to FIG. 34, there is shown another practical model, similar to those shown in FIGS. 29 – 33, which may also be used in accordance with the foregoing analysis, the length of the iron core being designated as $l$. The equivalent resistance $r_p$ of the cooking vessel and the electromagnetic force F applied to the vessel per 1 ampere turn can of course be calculated from Maxwell's electromagnetic equation. As is well known, the equation is quite complicated involving an integral function and accordingly a detailed description will be omitted and only the results of the calculations, which may be made by using a large size computer, will be disclosed.

THICKNESS OF THE VESSEL COPPER PLATE

Figure 35:
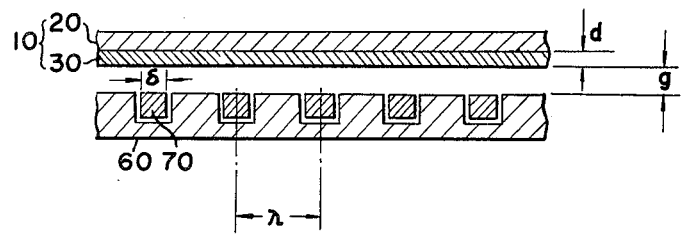
FIG. 35 is a sectional view of the components of FIG. 34 showing the various variable parameters of the present invention.
Figure 35A:
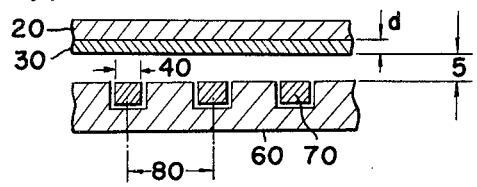
FIGS. 35A – 35C are sectional views of the model under conditions when the frequency, gap length, and coil pitch were respectively varied.

The parameters for the standard model are provided as follows, with reference to FIGS. 35 and 35A for the model constructed as shown in FIG. 34:

| | |
|---|---|
| Gap length | $g = 5$ mm |
| Coil pitch | $\lambda = 80$ mm |
| Coil width | $\delta = 40$ mm |
| Iron core length | $l = 120$ mm |
| Excitation frequency | $f = 60$ Hz |
| Ferromagnetic element | iron (thickness of 2 mm, permeability $\mu_r = 5,000$) |
| Non-magnetic high conductive element | copper (thickness $d_{Cu}$) |

Figure 36:
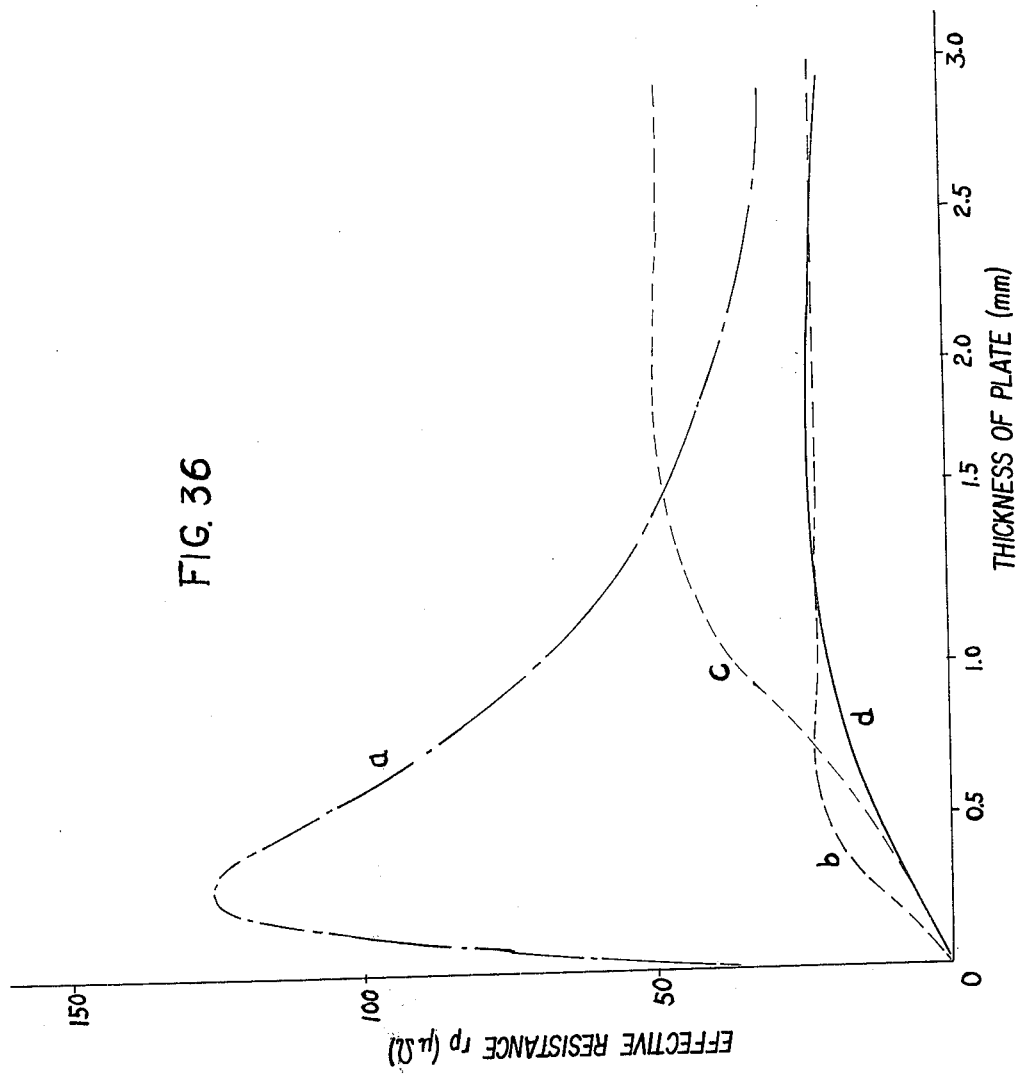
FIG. 36 is a graph showing the characteristic curves of the equivalent resistance as a function of the thickness of the various plates of the cooking vessels.

FIG. 36 is a characteristic graph illustrating the effective equivalent resistance of the vessel relative to the thickness of the copper plate under the influence of an exciting frequency of 60 Hz, the thickness of the iron plate being 2 mm, and the permeability $\mu_R$ being 5,000. If the thickness of the iron plate is more than approximately 1 mm, differences in the thickness do not affect the equivalent resistance. While curve (a) represents the copper-iron vessel of the present invention, the horizontal axis being the thickness $d_{Cu}$ of the copper plate, curve (b) represents the iron vessel which also has a permeability of 5,000, and the horizontal axis is with respect to the thickness of the iron plate. Curve (c) represents the iron vessel having a permeability $\mu_r$ of 500, such permeability being the minimum while a permeability $\mu_r$ of 5000 is the maximum, and consequently, it is seen that the equivalent resistance of a conventional iron cooking vessel would be between curves (b) and (c). Curve (d) similarly represents a copper cooking vessel and the horizontal axis represents the thickness of the copper plate.

When the permeability of the iron in the copper-iron cooking vessel is $\mu_R = 500$, the equivalent resistance of such vessel, when the thickness of the copper plate is substantially zero, is substantially the same as the iron vessel wherein the iron plate is of substantial thickness, i.e., more than 2 mm, and the permeability of the iron is $\mu_r = 500$, and in addition, the equivalent resistance of the copper-iron vessel having a copper plate of nearly zero thickness is also high. However, the equivalent resistance of the copper-iron vessel having a thicker copper plate is substantially the same as shown in curve (a).

From such characteristic curves then, the following facts are found:

1. With respect to the iron cooking vessel, when the permeability is high, the equivalent resistance is substantially constant in the instance that the thickness of the iron plate is more than 1 mm. When the permeability is low, the equivalent resistance is substantially constant in the instance that the thickness is more than 2 mm.
2. With respect to the copper vessel, the equivalent resistance is lower than that of the iron vessel having low permeability and is substantially the same as that of the iron vessel having maximum permeability.
3. With respect to the copper-iron vessel of this invention, the equivalent resistance $r_p$ can be higher than that of the iron cooking vessel. When the thickness of the copper plate is within the range of $$0 < d_{Cu} \leqq 1.7 \qquad [1],$$

the equivalent resistance of the copper-iron cooking vessel is the same as or higher than the maximum equivalent resistance of an iron vessel. Furthermore, when the thickness of the copper plate is within the range of $$0 < d_{Cu} \leqq 1.3 \qquad [2],$$

the equivalent resistance of the copper-iron vessel is higher than the maximum equivalent resistance of an iron cooking vessel.

When in fact the thickness of the copper plate is within the range of $$0.1 \leqq d_{Cu} \leqq 0.6 \qquad [3]$$

and especially within the range of $$0.2 \leqq d_{Cu} \leqq 0.4 \qquad [4]$$

the equivalent resistance is at its peak value, which is more than 2 times the maximum equivalent resistance of an iron vessel, such peak value or maximum equivalent resistance occurring at a plate thickness of $$d_{Cu} = 0.3 \qquad [5]$$

and is approximately 2.4 times the maximum equivalent resistance of the iron cooking vessel, and approximately 6 times the maximum equivalent resistance of a copper cooking vessel. It is further noted that the maximum equivalent resistance of the copper-iron vessel and the optimum thickness of the copper plate are not substantially dependent upon the thickness and permeability of the iron portion of such vessel.

Figure 37:
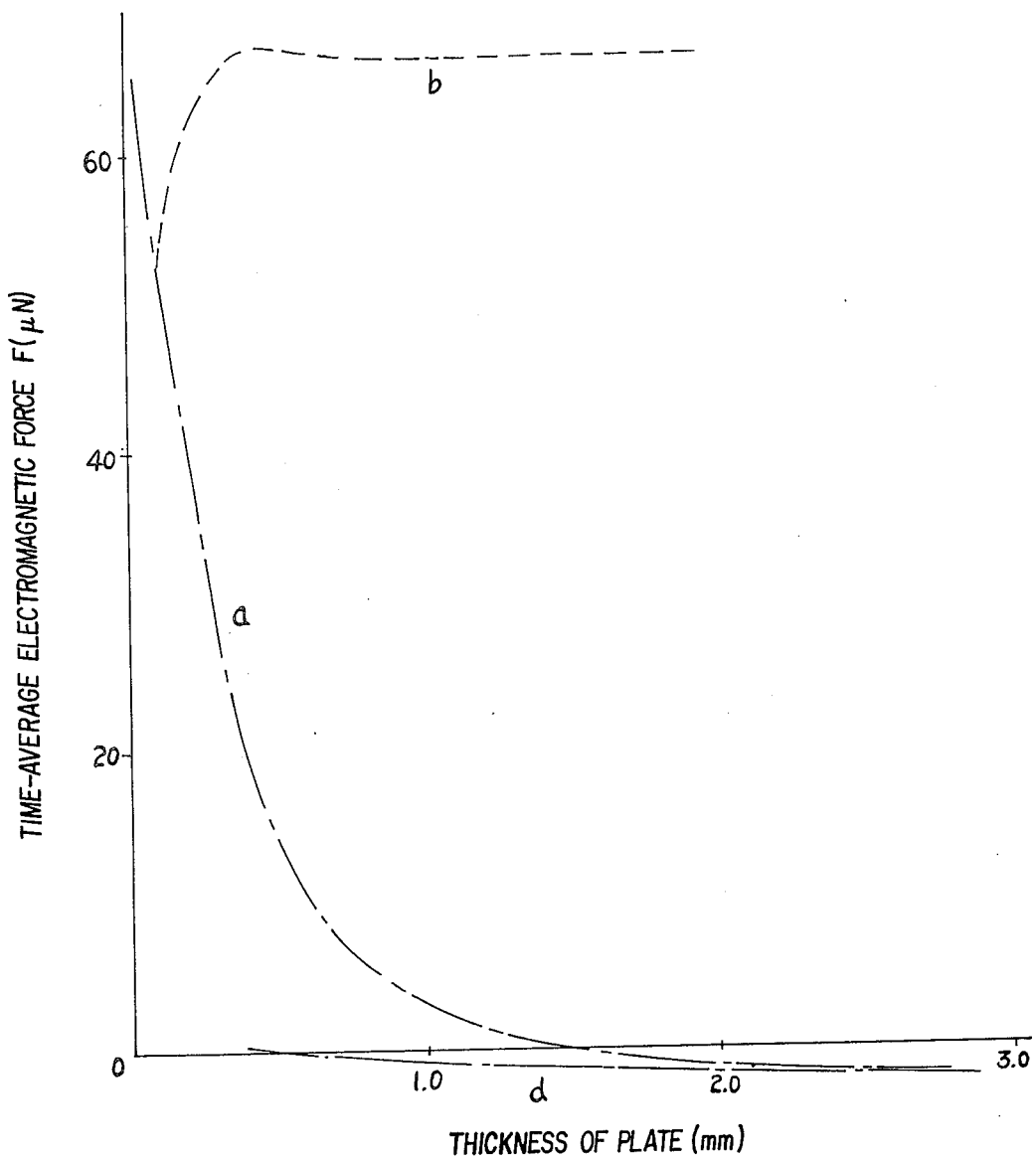
FIG. 37 is a graph showing the characteristic curves of the time average electromagnetic force applied to the vessels as a function of the thickness of the various plates of the cooking vessels.

Referring now to FIG. 37, there is shown a set of characteristic curves illustrating the dependency of the time-average electromagnetic force F, per ampere turn, which is applied to the cooking vessel, relative to the thickness of the copper plate. As a result of such graph, the following facts are apparent:

1. The electromagnetic force applied to the iron vessel, as seen by curve b, is a substantially high attractive force and is substantially constant when the thickness of the iron plate is greater than approximately 1 mm.
2. The repulsive or floating force as seen by curve d, is applied to the copper vessel and is less than such force applied to the iron vessel by one order.
3. The attractive force of the copper-iron vessel, as seen by curve a, is remarkably reduced depending upon the increase in the thickness of the copper plate, whereupon the electromagnetic force may be zero, and in fact when the thickness increases still further, a small repulsive force may be attained.

Thus, when the thickness of the copper plate is within the range of $$0 < d_{Cu} < 1.5 \qquad [6]$$

the attractive force of the copper-iron vessel is given, but it is less than the attractive force imparted to the iron vessel, and especially when such thickness is within the range of $$1.3 \leqq d_{Cu} < 1.5 \qquad [7]$$

the electromagnetic force is less than the gravitational force acting upon the vessel and consequently vibrational noise is small. Moreover, when the thickness is within the range of $$1.5 < d_{Cu} \leqq 1.7 \qquad [8]$$

a small repulsive force is obtained, but such force is also less than the gravitational force acting upon the vessel and accordingly, the vessel does not float and the vibrational noise is small.

Accordingly, from the viewpoint of the electromagnetic force, when the thickness of the copper plate is within the range of $$0 < d_{Cu} \leqq 1.7 \qquad [9]$$

the effects of this invention are remarkable, and especially when the thickness is within the range of $$1.3 \leqq d_{Cu} \leqq 1.7 \qquad [10]$$

the vibrational noise is remarkably decreased, and still further, when the thickness is $$d_{Cu} = 1.5 \quad [11]$$

the average electromagnetic force is zero and the vibrational noise is minimized.

The average electromagnetic force is in fact remarkably reduced depending upon the increase in thickness of the copper plate so as to rapidly decrease the attractive force applied to the iron portion while gradually increasing the repulsive force being applied mainly to the copper plate. Under such conditions, wherein the thickness is relatively large, both the instant average value and absolute value of the electromagnetic force are quite small, and consequently the noise and vibration of the cooking vessel are remarkably low.

In consideration of the combined desirable effects derived from FIGS. 36 and 37, from the viewpoint of an increase in the equivalent resistance and a decrease in the electromagnetic force, such effects are most apparent when the thickness of the copper plate is within the range of $$0 < d \leq 1.7 \text{ mm} \quad [12]$$

and the effects are especially significant when the thickness is within the range of $$0.2 \leq d \leq 1.7 \text{ mm} \quad [13]$$

From the viewpoint of a high equivalent resistance, it is suitable to have a thickness within the range of $$0.2 \leq d_{Cu} \leq 1.3 \quad [14]$$

and especially within the range of $$0.2 \leq d_{Cu} \leq 0.4 \quad [15]$$

From the viewpoint of a low electromagnetic force, it is suitable to have a thickness within the range of $$1.3 \leq d_{Cu} \leq 1.7 \quad [16]$$

which excludes the high electromagnetic force range.

It is further noted that the thickness of the copper plate which corresponds with the point at which the equivalent resistance is maximized does not conform with the thickness of the copper plate at the point where the electromagnetic force is zero. When in fact the thickness of the copper plate is 0.3 mm, so as to attain the maximum equivalent resistance, the electromagnetic force is approximately one half of the electromagnetic force obtained with the iron vessel. When the thickness of the copper plate is 1.5 mm so as to render the electromagnetic force zero the equivalent resistance is slightly greater than the maximum equivalent resistance of the iron vessel. From the description of the characteristic curves shown in FIGS. 36 and 37, it is thus clear that the vessel 10 of this invention is substantially superior to a conventional iron or copper cooking vessel.

The desirable thickness of the copper plate of the cooking vessel of the present invention is dependent upon several variable parameters and it will now be illustrated how the desirable thickness of the plate may be progressively altered as the various parameters are varied or altered.

FREQUENCY DEPENDENCY OF THE DESIRABLE THICKNESS OF THE COPPER PLATE

Figure 39:
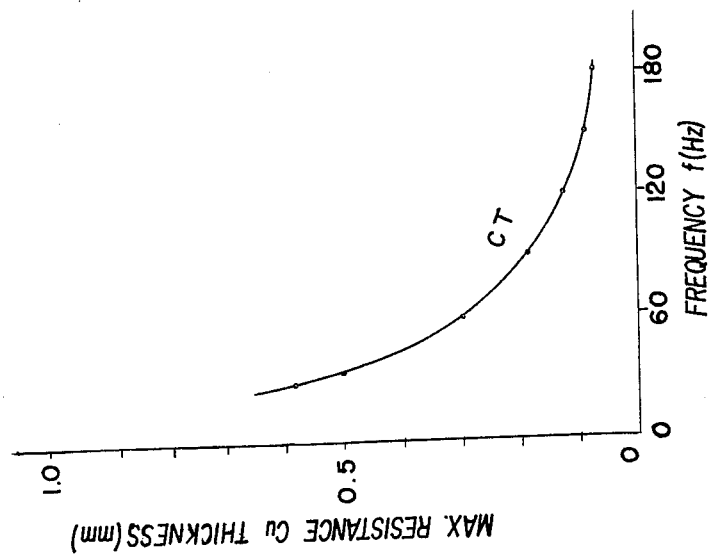
FIG. 39 is a graph showing the characteristic curve of the frequency dependency of the optimum equivalent resistance, from FIG. 38.

Initially, it will be illustrated how the desirable thickness of the copper plate will be altered due to variations in excitation frequency. The calculations are obtained by merely changing the frequency for the standard model of FIG. 35A. First, the frequency dependency of the equivalent resistance is considered. FIG. 38 shows a set of characteristic curves of the relation between the equivalent resistance $r_p$ to the thickness of the copper plate $d_{Cu}$ as a function of frequency $f$. It is understood that the equivalent resistance increases depending upon an increase in frequency, and the optimum thickness of the copper plate for the maximum equivalent resistance decreases depending upon an increase in frequency. In conjunction with such results, FIG. 39 shows a characteristic curve of the change in the optimum thickness of the copper plate at the points of maximum equivalent resistance relative to a change in frequency, which is derived from FIG. 38, it of course being clear that the optimum thickness is inversely proportional to the frequency. Accordingly, as is clear from FIG. 38, the desirable thickness of the copper plate from the viewpoint of the equivalent resistance is substantially inversely proportional to the frequency.

Figure 41:
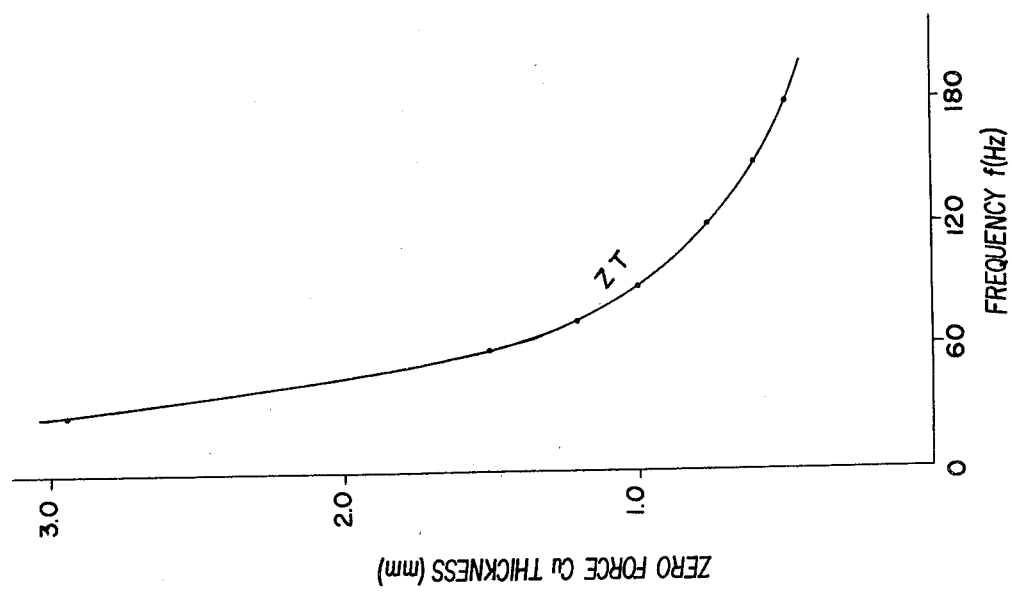
FIG. 41 is a graph showing the characteristic curve of the frequency dependency of the optimum copper plate thickness at zero time-average electromagnetic force, from FIG. 40.

The frequency dependency of the electromagnetic force may also be considered, and with particular reference to FIG. 40, characteristic curves of the electromagnetic force to the thickness of the copper plate, as a function of the frequency $f$, may be seen. It is found that the electromagnetic force decreases depending upon an increase of the frequency, and that the optimum thickness of the copper plate corresponding to zero electromagnetic force decreases depending upon an increase of frequency. In conjunction with such information, FIG. 41 shows a characteristic curve of the frequency dependency of the optimum thickness of the copper plate which occurs at zero electromagnetic force, such data of course being derived from FIG. 40. From the above characteristic curve, it is clear that the optimum thickness of the copper plate is also inversely proportional to the frequency, and accordingly, as is clear from FIG. 40, the desirable thickness of the copper plate from the viewpoint of the electromagnetic force is substantially inversely proportional to the frequency.

GAP DEPENDENCY OF THE DESIRABLE THICKNESS OF THE COPPER PLATE

Figure 35B:
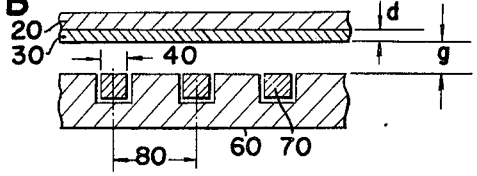
Figure 42:
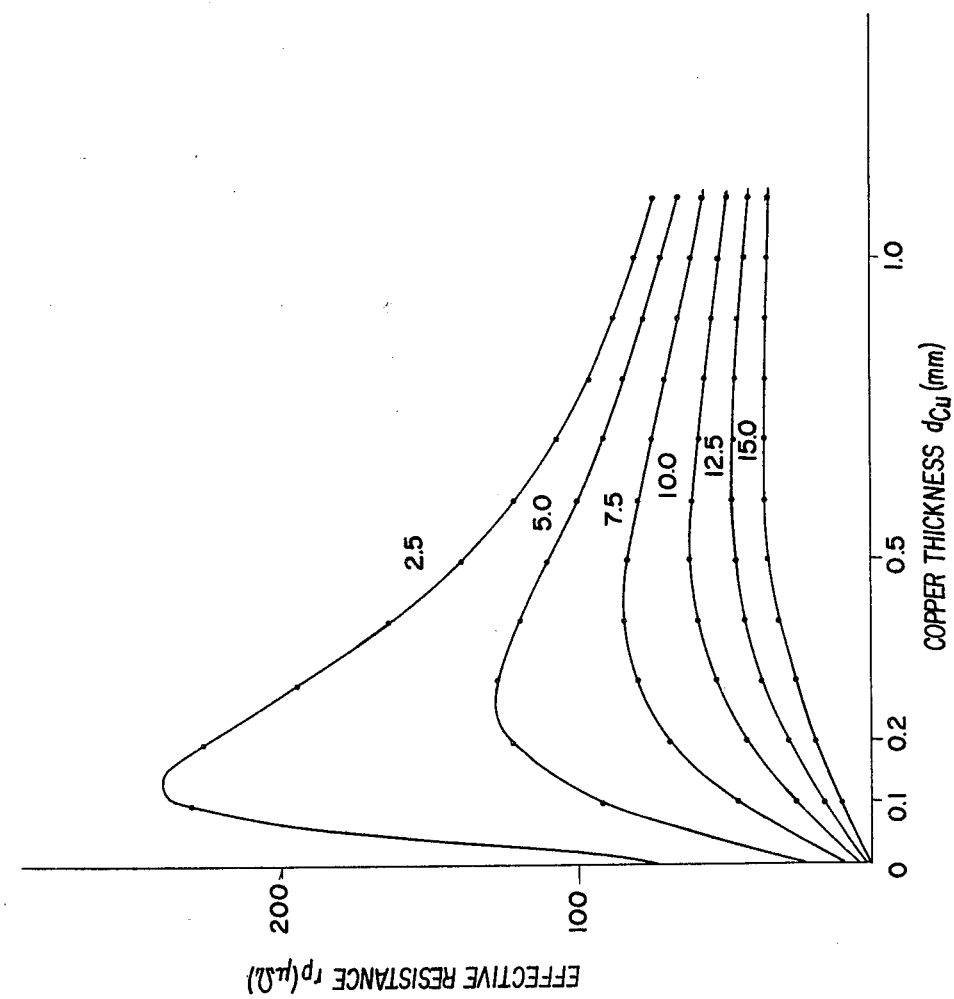
FIG. 42 is a graph showing the characteristic curves of the equivalent resistance as a function of the copper plate thickness with a parameter of the gap length.
Figure 43:
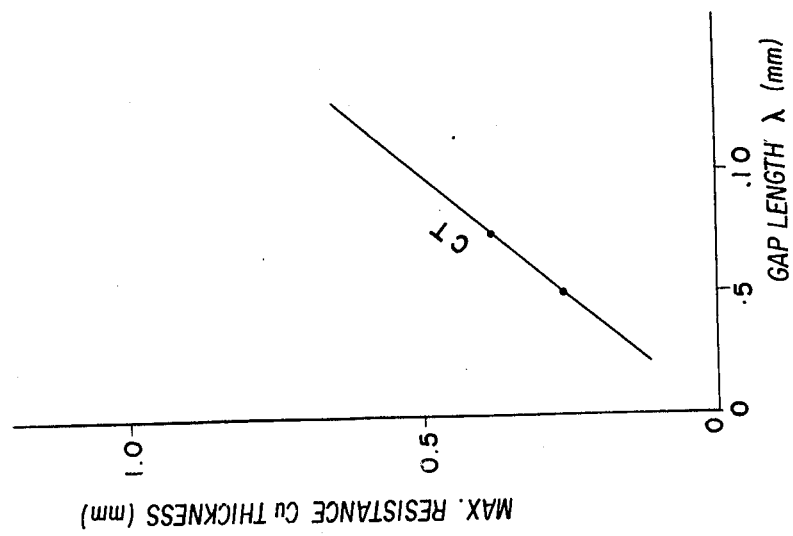
FIG. 43 is a graph showing the characteristic curve of the gap length dependency of the optimum copper plate thickness at maximum equivalent resistance, from FIG. 42.

What will now be considered is how to alter the desirable thickness of the copper plate by varying the gap between the bottom surface of the cooking vessel and the polar surface of the excitation iron core. The calculations are obtained by merely changing the gap within the standard model of FIG. 35B, the frequency remaining constant at 60 Hz. Referring to FIG. 42, there is shown a set of characteristic curves depicting the relation between the thickness of the copper plate to the equivalent resistance as a function of the gap length $g$. It is consequently apparent that the equivalent resistance decreases and the optimum thickness increases with a corresponding increase in gap length. FIG. 43 similarly shows a characteristic curve of the gap length dependency of the optimum thickness of the copper plate at the points of maximum resistance which data is of course introduced from FIG. 42. It is thus clear that the optimum thickness increases in proportion to the gap length, and furthermore, it is clear from FIG. 42 that the desirable thickness of the copper plate from the viewpoint of the equivalent resistance increases substantially in proportion to the gap length. A gap dependency of the electromagnetic force may similarly be considered.

Figure 44:
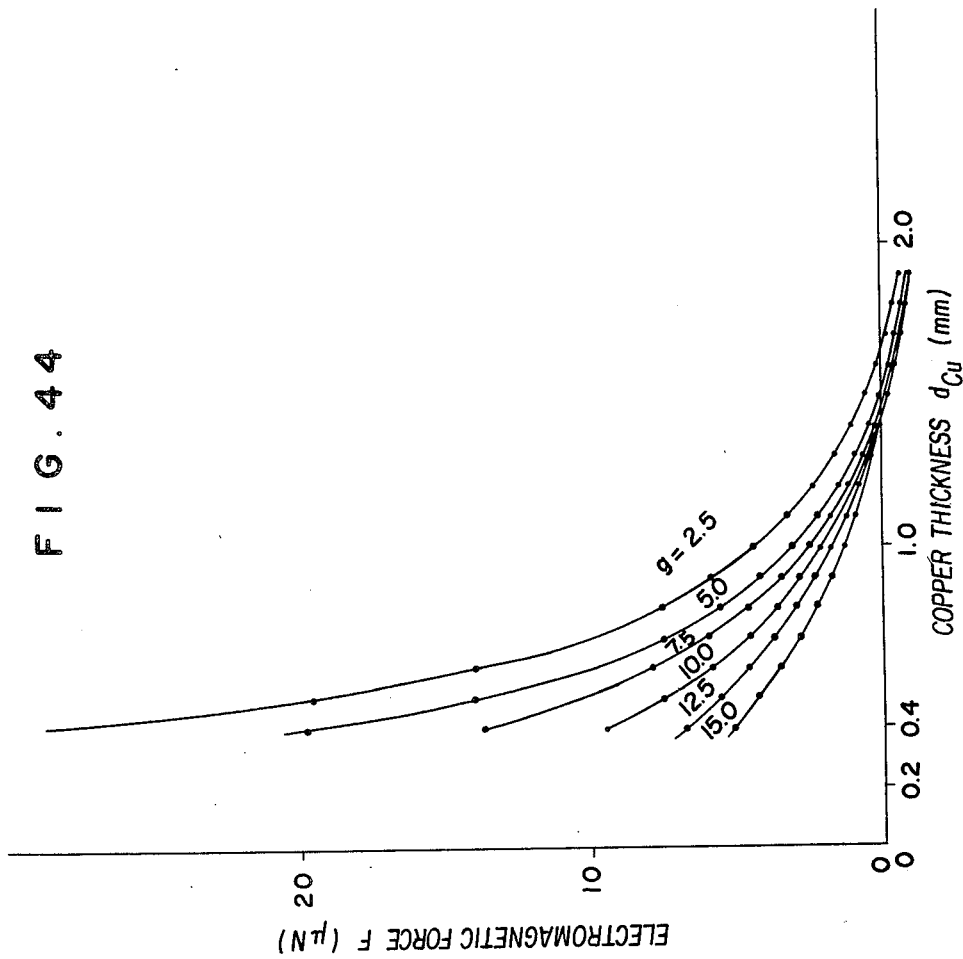
FIG. 44 is a graph showing the characteristic curves of the time-average electromagnetic force as a function of copper plate with a parameter of the gap length.
Figure 45:
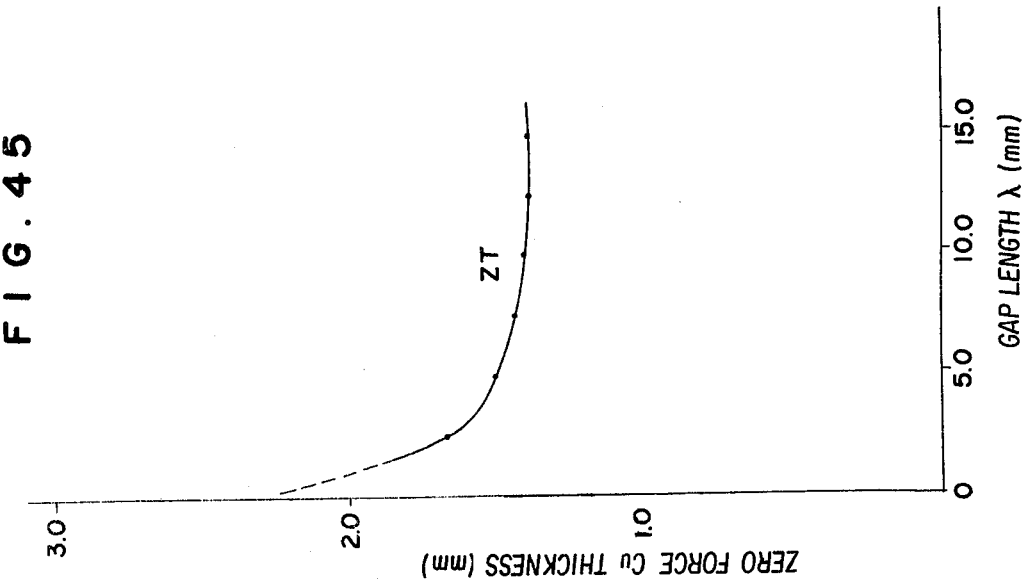
FIG. 45 is a graph showing the characteristic curve of the gap length dependency of the optimum copper plate thickness at zero time-average electromagnetic force, from FIG. 44.

Referring now to FIG. 44, a set of characteristic curves illustrating the variation in the thickness of the copper plate as a function of the electromagnetic force for particular gap lengths, is shown. It is accordingly seen that the electromagnetic force decreases, and the optimum thickness of the copper plate for zero electromagnetic force also decreases with a corresponding increase in the gap length. FIG. 45 further illustrates the gap dependency of the optimum thickness of the copper plate for zero electromagnetic force as derived from FIG. 44. The function corresponding to the curve of FIG. 45 may be calculated as follows:

The optimum thickness for zero electromagnetic force is substantially in proportion to $$\left[\exp\left(-\frac{g}{2}\right) + 1.4\right]$$

Accordingly, as shown in FIG. 44, the desirable thickness of the copper plate from the viewpoint of the electromagnetic force is substantially in proportion to $$\left[\exp\left(-\frac{g}{2}\right) + 1.4\right]$$

COIL PITCH DEPENDENCY OF THE DESIRABLE THICKNESS OF THE COPPER PLATE

Figure 35C:
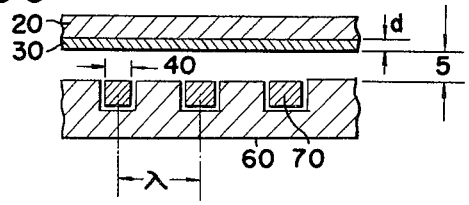
Figure 46:
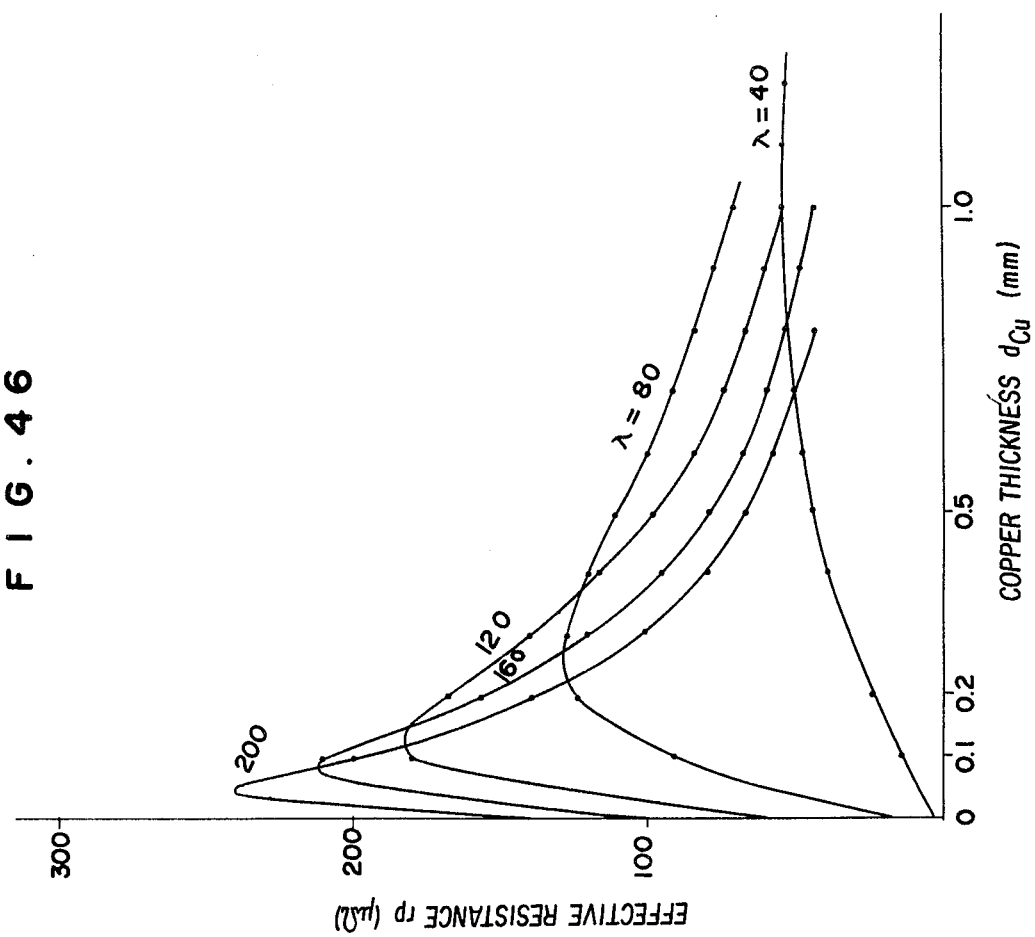
FIG. 46 is a graph showing the characteristic curves of the equivalent resistance as a function of the copper plate thickness with a parameter of the coil pitch.

In attaining the desirable thickness of the copper plate, the coil pitch of the exciter may also be varied. The calculations are given by merely changing the coil pitch λ for the standard model of FIG. 35C, the frequency being maintained at 60 Hz. With particular reference then to FIG. 46, a coil pitch dependency of the equivalent resistance may be considered relative to the thickness of the copper plate, and from the resulting set of curves, it is found that when the coil pitch is increased, the equivalent resistance is decreased within the region corresponding to a large thickness of the copper plate, while on the other hand, the equivalent resistance is increased within the region corresponding to a small thickness of the copper plate. Similarly, it is found that the optimum thickness of the maximum equivalent resistance decreases depending upon an increase in the coil pitch.

Figure 48:
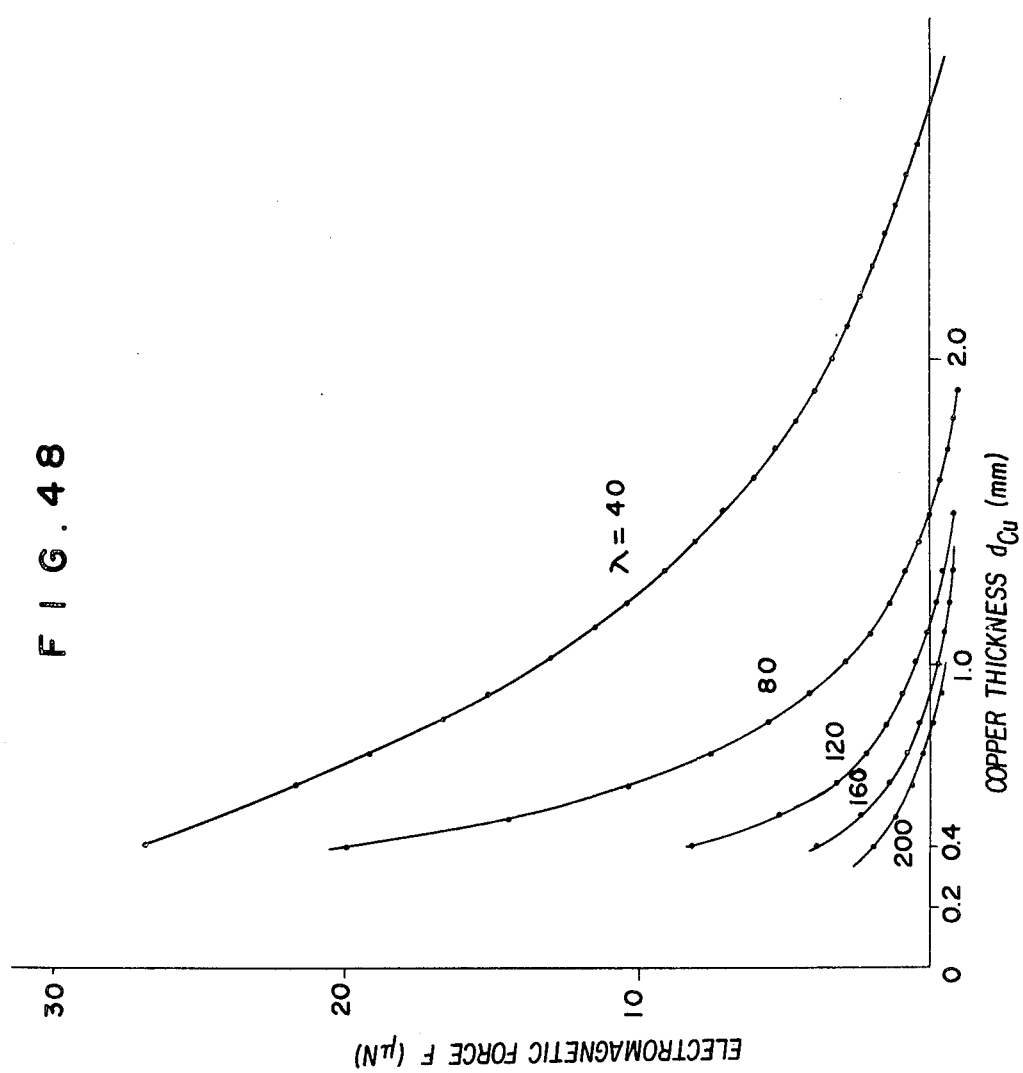
FIG. 48 is a graph showing the characteristic curves of the time average electromagnetic force as a function of the copper plate thickness with a parameter of the coil pitch.
Figure 47:
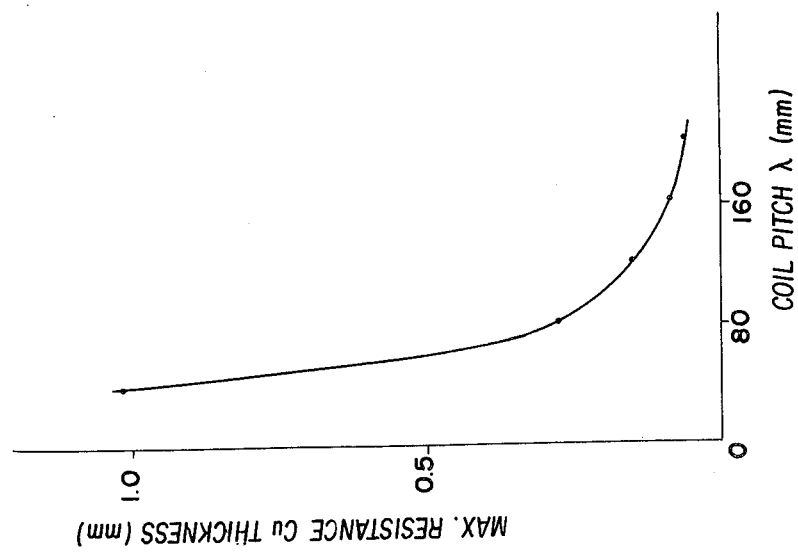
FIG. 47 is a graph showing the characteristic curve of the coil pitch dependency of the optimum copper plate thickness at the maximum equivalent resistance, from FIG. 46.

FIG. 47 correspondingly shows a characteristic curve illustrating the coil pitch dependency of the optimum thickness of the copper plate occurring at the points of maximum resistance as derived from FIG. 46, and consequently, it is clear that the optimum thickness is inversely proportional to the square of the coil pitch λ, and likewise, as shown in FIG. 46, the desirable thickness from the viewpoint of the equivalent resistance is substantially inversely proportional to square of the coil pitch. A coil pitch dependency of the electromagnetic force may also be considered, and FIG. 48 illustrates a set of characteristic curves showing the relationship between the thickness of the copper plate and the electromagnetic force as a function of the coil pitch. The electromagnetic force is seen to decrease depending upon an increase in the coil pitch, and the optimum thickness of the copper plate for zero electromagnetic force also decreases depending upon an increase in the coil pitch. The coil pitch dependency may also be plotted upon a graph as a function of the optimum thickness of the copper plate for zero electromagnetic force as seen in FIG. 49, the data for which is derived from FIG. 48. It is consequently found that the optimum thickness is inversely proportional to the coil pitch taken to a power having a value of .85, and thus, the desirable thickness of the copper plate, from the viewpoint of the electromagnetic force, is substantially inversely proportional to the coil pitch taken to a power having the value of 0.85.

DEPENDENCY OF THE DESIRABLE THICKNESS OF THE COPPER PLATE UPON FREQUENCY, GAP LENGTH AND COIL PITCH

The aforementioned analysis thus discloses the following results, that the optimum thickness of the copper plate at the maximum equivalent resistance is substantially inversely proportional to the frequency and the coil pitch while being substantially proportional to the gap length. The optimum thickness at zero average electromagnetic force is substantially inversely proportional to the frequency, is substantially in proportion to $$\left[\exp\left(-\frac{g}{2}\right) + 1.4\right]$$

for the gap length, and is substantially inversely proportional to λ 0.8 for the coil pitch. In the standard model, the desirable range of the thickness of the copper plate is shown by the equations [12] – [16]. Hence, when the aforementioned factors are considered, the desirable range of the thickness of the copper plate can be shown, as follows, utilizing the following factors which may be defined as follows:

$$\alpha = \frac{60}{f} \cdot \frac{g}{5} \cdot \frac{80^2}{\lambda^2} \qquad [17]$$

and $$\beta = \frac{60}{f} \cdot \frac{\left[\exp\left(-\frac{g}{2}\right) + 1.4\right]}{\left[\exp\left(-\frac{5}{2}\right) + 1.4\right]} \cdot \frac{80^{0.85}}{\lambda^{0.85}} \qquad [18]$$

When the thickness of the copper plate $d_{Cu}$ is within the range of $$0 < d_{Cu} \leq 1.7\beta \qquad [19]$$

the effects of this invention can be obtained, and except for the high electromagnetic force range, when the thickness is within the range of $$0.2\alpha \leq d_{Cu} \leq 1.7\beta \qquad [20]$$

the effects of the invention are remarkably high. From the viewpoint of high equivalent resistance, when the thickness is within the range of $$0.2\alpha \leq d_{Cu} \leq 1.3\beta \qquad [21]$$

and is especially within the range of $$0.2\alpha \leq d_{Cu} \leq 0.4\beta \qquad [22]$$

the effects of this invention are remarkable. Similarly, from the viewpoint of low electromagnetic force, when the thickness is within the range of $$1.3\beta \leq d_{Cu} \leq 1.7\beta \qquad [23]$$

the effects of the invention are again remarkable.

DESIRABLE THICKNESS OF AN ALUMINUM PLATE OR OTHER HIGH CONDUCTIVE PLATE

The foregoing models of the cooking vessel were comprised of an iron vessel having a copper plate secured to the bottom surface. When however, an aluminum or other high conductive plate is utilized in lieu of the copper plate, such is theoretically illustrated and is experimentally confirmed to give similar results. For example, the specific resistances and thicknesses of the copper plate, the aluminum plate and in general, a non-magnetic high conductive plate are respectively designated as $\rho$ Cu, $d_{Cu}$; $\rho$ Al, $d_{Al}$ and $\rho_M$, $d_M$, and the relations shown in FIGS. 36–49 are respectively applied without change, the following equation being utilized:

$d_{Cu}/\rho Cu = d_{Al}/\rho_{Al} = d_M/\rho_M$

Consequently, the horizontal axis denoting plate thickness is modified as follows:

$$d_{Al} = d_{Cu} \times \frac{\rho_{Al}}{\rho_{Cu}}$$

for the aluminum plate, and $$d_M = d_{Cu} \times \frac{\rho_M}{\rho_{Cu}}$$

for the general high conductive plate. Accordingly, in the case of the aluminum plate since the specific resistance $\rho_{Al}$ is 2.75 ($\mu\Omega$-cm), and the specific resistance of the copper plate is $\rho_{Cu} = 1.72$ ($\mu\Omega$-cm), the thickness of the aluminum plate is $$d_{Al} = d_{Cu} \times \frac{2.75}{1.72} = 1.6 \, d_{Cu}.$$

The desirable thickness then, from the foregoing equations, is as follows: When the thickness of the aluminum plate $d_{Al}$ is within the range of $$0 < d_{Al} \leq 2.7\beta \qquad [24]$$

the effects of this invention are obtained, and when the thickness is within the range of $$0.3\alpha \leq d_{Al} \leq 2.7\beta \qquad [25]$$

the effects of this invention are remarkably high except within the high electromagnetic force range. From the viewpoint of high equivalent resistance, it is preferable to be within the range of $$0.3\alpha \leq d_{Al} \leq 2.1\beta \qquad [26]$$

and especially within the range of $$0.3\alpha \leq d_{Al} \leq 0.6\beta \qquad [27]$$

and from the viewpoint of electromagnetic force, it is preferable to be within the range of $$2.1\beta \leq d_{Al} \leq 2.7\beta \qquad [28]$$

When the general high conductive plate is utilized, we have the equation $$d_M = d_{Cu} \times \frac{\rho_M}{1.72}$$

and consequently the desirable thickness of such plate is as follows, from equations [19]–[23]:
When the thickness of the high conductive plate is within the range of $$0 < d_M < 1.7\beta \times \frac{\rho_M}{1.72} \qquad [29]$$

the effects of this invention are obtained, and when the thickness is within the range of $$0.2\alpha \times \frac{\rho_M}{1.72} \leq d_M \leq 1.7\beta \times \frac{\rho_M}{1.72} \qquad [30]$$

the effects of this invention are remarkably high. From the viewpoint of high equivalent resistance, it is preferable to have the plate thickness within the range of $$0.2\alpha \times \frac{\rho_M}{1.72} \leq d_M \leq 1.3\beta \times \frac{\rho_M}{1.72} \qquad [31]$$

and to be especially within the range of $$0.2\alpha \times \frac{\rho_M}{1.72} \leq d_M \leq 0.4\beta \times \frac{\rho_M}{1.72} \qquad [32]$$

From the viewpoint of low electromagnetic force, it is preferable to have the thickness within the range of $$1.3\beta \times \frac{\rho_M}{1.72} \leq d_M \leq 1.7\beta \times \frac{\rho_M}{1.72} \qquad [33]$$

In addition to the performance of the above theoretical calculations various experiments were performed, the results of which correspond well to the theoretical results. The following is one example of such experiments.

EXAMPLE

FIGS. 50A – 50C show the structure and size of a practical model utilized in one of the experiments. In such model, the equivalent resistance $r_p$ of the cooking vessel was measured by varying the thickness of the copper plate of the copper-iron vessel and the results are shown in FIG. 51, which corresponds well with the characteristic curve of FIG. 36. The absolute value of the equivalent resistance is slightly different, because the effects of the coil edge was not considered in the calculations corresponding to FIG. 36, as shown by the model of FIG. 34, wherein the iron core length was 120 mm. On the other hand, the effects of the coil edge were present in the experiment. However, the variation in the equivalent resistance $r_p$ to the variation in the thickness of the copper plate corresponded well with the theoretical results, and consequently the practical model was confirmed as being able to attain the results desired of this invention.

obviously, many modifications and variations of the present invention are possible in light of the above teachings. It is to be understood therefore, that within the scope of the appended claims the present invention may be practiced otherwise than as specifically described herein.

What is claimed as new and desired to be secured by Letters Patent of the United States is:

1. Induction heating apparatus comprising:
   an iron core exciter having a cover plate and having an iron core excitation winding having a winding pitch for generating a low frequency alternating magnetic field,
   a ferromagnetic element disposed adjacent to the exciter,
   a non-magnetic high conductive element joined to the ferromagnetic element and interposed between the exciter and the ferromagnetic element and supported by the cover plate for the exciter to form a gap between the exciter and the high conductive element,
   the iron core exciter generating alternating magnetic flux passing from the exciter through the high conductive element to the ferromagnetic element to inductively heat the high conductive element,
   the excitation frequency being 60 Hz, the gap being 5 mm,
the winding pitch being 80 mm, and
the high conductive element being copper with a thickness of 0.3 mm to achieve the maximum effective resistance.

2. Induction heating apparatus in accordance with claim 1 wherein the high conductive element is copper with a thickness of 1.5 mm to achieve zero time-average electromagnetic force.

3. Induction heating apparatus in accordance with claim 1 wherein the gap is 2.5 mm and the high conductive element is copper with a thickness of 0.15 mm to achieve the maximum effective resistance.

4. Induction heating apparatus in accordance with claim 1 wherein the gap is 2.5 mm and the high conductive element is copper with a thickness of 1.7 mm to achieve zero time-average electromagnetic force.

5. Induction heating apparatus in accordance with claim 1 wherein the winding pitch is 120 mm and the high conductive element is copper with a thickness of 0.14 mm to achieve the maximum effective resistance.

6. Induction heating apparatus in accordance with claim 1 wherein the winding pitch is 120 mm and the high conductive element is copper with a thickness of 1.1 mm to achieve zero time-average electromagnetic force.

7. Induction heating apparatus in accordance with claim 1 wherein the high conductive element is aluminum with a thickness of 0.5 mm to achieve the maximum effective resistance.

8. Induction heating apparatus in accordance with claim 1 wherein the high conductive element is aluminum with a thickness of 2.4 mm to achieve zero time-average elctromagnetic force.

9. Induction heating apparatus in accordance with claim 1 wherein the gap is 2.5 mm and the high conductive element is aluminum with a thickness of 0.24 mm to achieve the maximum effective resistance.

10. Induction heating apparatus in accordance with claim 1 wherein the gap is 2.5 mm and the high conductive element is aluminum with a thickness of 2.7 mm to achieve zero time-average electromagnetic force.

11. Induction heating apparatus in accordance with claim 1 wherein the winding pitch is 120 mm and the high conductive element is aluminum with a thickness of 0.2 mm to achieve the maximum effective resistance.

12. Induction heating apparatus in accordance with claim 1 wherein the winding pitch is 120 mm and the high conductive element is aluminum with a thickness of 1.7 mm to achieve zero time-average electromagnetic force.

* * * * *